US009384447B2

(12) United States Patent
Forero et al.

(10) Patent No.: US 9,384,447 B2
(45) Date of Patent: Jul. 5, 2016

(54) PASSIVE TRACKING OF UNDERWATER ACOUSTIC SOURCES WITH SPARSE INNOVATIONS

(71) Applicant: THE UNITED STATES OF AMERICA AS REPRESENTED BY THE SECRETARY OF THE NAVY, Washington, DC (US)

(72) Inventors: Pedro A. Forero, San Diego, CA (US); Paul A. Baxley, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 0 days.

(21) Appl. No.: 14/961,705

(22) Filed: Dec. 7, 2015

(65) Prior Publication Data

US 2016/0086093 A1 Mar. 24, 2016

Related U.S. Application Data

(63) Continuation-in-part of application No. 14/285,400, filed on May 22, 2014, now Pat. No. 9,264,809.

(51) Int. Cl.
| | |
|---|---|
| *H04R 27/00* | (2006.01) |
| *G06N 7/00* | (2006.01) |
| *G06F 17/14* | (2006.01) |
| *H04R 1/44* | (2006.01) |
| *H04R 3/00* | (2006.01) |
| *H04R 1/40* | (2006.01) |
| *H04R 29/00* | (2006.01) |
| *G01S 5/18* | (2006.01) |

(52) U.S. Cl.
CPC ... *G06N 7/00* (2013.01); *G01S 5/18* (2013.01); *G06F 17/14* (2013.01); *H04R 1/406* (2013.01); *H04R 1/44* (2013.01); *H04R 3/005* (2013.01); *H04R 29/005* (2013.01)

(58) Field of Classification Search
None
See application file for complete search history.

(56) References Cited

U.S. PATENT DOCUMENTS

| | | | |
|---|---|---|---|
| 7,782,710 B1 * | 8/2010 | Uzes | G01S 3/143 367/135 |
| 8,290,170 B2 * | 10/2012 | Nakatani | 381/66 |
| 2015/0287422 A1 * | 10/2015 | Short | G01S 7/288 704/205 |

* cited by examiner

*Primary Examiner* — Muhammad N Edun
(74) *Attorney, Agent, or Firm* — SPAWAR Systems Center Pacific; Kyle Eppele; Ryan J. Friedl

(57) ABSTRACT

A system and method involve acoustic source localization using passive sonar and capitalizing on the sparse nature of a source location map (SLM). Two types of sparsity are exploited, namely sparsity in the support of the SLMs and sparsity in the innovations across consecutive SLMs. The first type is motivated by the desire to construct SLMs whose non-zero entries corresponded to locations where sources are present. The second type of sparsity is motivated by the observation that few changes occur in the support of consecutive SLMs. Per time instant, an SLM is obtained as the solution of a regularized least-squares problem, where the regularization terms are chosen to encourage the desired sparse structures in each SLM and the innovations. Each SLM may be obtained via a specifically-tailored, computationally-efficient proximal gradient algorithm.

20 Claims, 12 Drawing Sheets

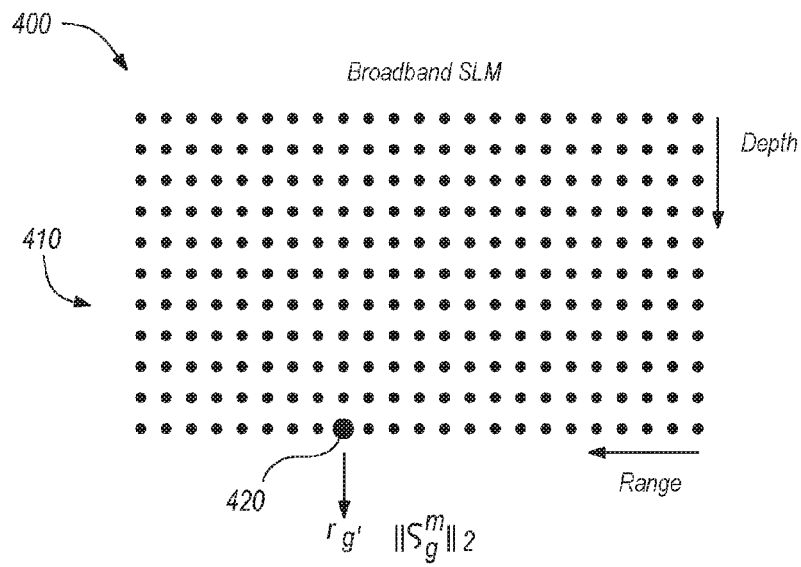
FIG. 5
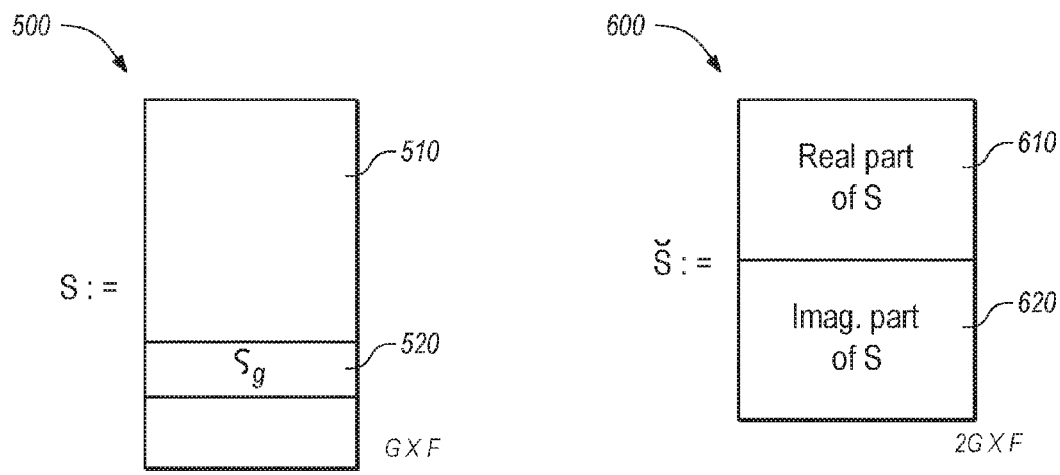
FIG. 6
FIG. 7

Algorithm 1 ADMM algorithm for solving (12).
Require: Parameters $L_h, \mu, \lambda, \eta > 0$, $w_g^m[j-1]$, and $\check{v}_g^{m-1}$
  1: Randomly initialize $\zeta_g[0]$ and $\gamma_g[0]$.
  2: for $\iota = 1, ..., \iota_{max}$ do
  3:   Compute $\check{v}_g[\iota]$ via (17a).
  4:   Compute $\zeta_g[\iota]$ via (17b).
  5:   Compute $\gamma_g[\iota]$ via (16c).
  6: end for

900 —

| Algorithm 2 PG algorithm for solving (6). |
|---|
| Require: Tuning parameters $\mu, \lambda > 0$ and $\breve{S}^{m-1}$ |
| 1: for $j = 1, 2, ..., j_{max}$ do |
| 2:   {These updates can be parallelized} |
| 3:   for $g = 1, ..., G$ do |
| 4:     Compute $w_g^m[j-1]$ via (9) |
| 5:     if $\breve{v}_g^{m-1} = 0_{2F}$ then |
| 6:       Update $\breve{v}_g^m[j]$ via (12) |
| 7:     else if Condition (13a) is true then |
| 8:       Set $\breve{v}_g^m[j] = 0_{2F}$ |
| 9:     else if Condition (13b) is true then |
| 10:      Set $\breve{v}_g^m[j] = \breve{v}_g^{m-1}$ |
| 11:     else |
| 12:      Update $\breve{v}^m[j]$ via Algorithm 1 |
| 13:     end if |
| 14:   end for |
| 15: end for |

| Algorithm 3 APG algorithm for solving (6). |
|---|
| Require: Tuning parameters $\mu, \lambda > 0$ and $\breve{S}^{m-1}$ |
| 1: Set $\Sigma[1] = \breve{S}^{m-1}$ and $\beta(1) = 1$ |
| 2: for $j = 1, 2, ..., j_{max}$ do |
| 3:   {These updates can be parallelized} |
| 4:   Update $\breve{S}^m$ as |
| $$\breve{S}^m[j] = \arg\min_{\breve{S}^m} [H(\breve{S}^m; \Sigma[j]) + \Theta(\breve{S}^m)]$$ |
| 5:   Compute $\beta[j+1] = \left[1 + \sqrt{1 + 4\beta^2[j]}\right]/2$ |
| 6:   Update $\Sigma[j]$ as |
| $$\Sigma[j+1] = \breve{S}^m[j] + \left[\frac{\beta[j]-1}{\beta[j]+1}\right]\left[\breve{S}^m[j] - \breve{S}^m[j-1]\right]$$ |
| 7: end for |

FIG. 11

PASSIVE TRACKING OF UNDERWATER ACOUSTIC SOURCES WITH SPARSE INNOVATIONS

CROSS-REFERENCE TO RELATED APPLICATIONS

This application is a continuation-in-part of commonly-assigned U.S. patent application Ser. No. 14/285,400, entitled "Multitask Learning Method for Broadband Source-Location Mapping of Acoustic Sources", the content of which is fully incorporated by reference herein.

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 103809.

BACKGROUND

Tracking acoustic sources via passive sonar is a challenging task common to several underwater monitoring and surveillance systems. Classical tracking approaches based on matched-field tracking and Kalman filtering techniques are impractical due to their large computational and storage requirements.

BRIEF DESCRIPTION OF THE DRAWINGS

FIG. 5 shows a diagram of a broadband source localization map.

FIG. 6 shows a diagram of the structure of the regression coefficient matrix S.

FIG. 7 shows a diagram illustrating the structure of the real-valued matrix Š, which comprises the real and imaginary parts of the complex-valued matrix S as two different blocks.

FIG. 10 shows a diagram of a PG algorithm developed for estimating $S_m$.

FIG. 11 shows a diagram of an accelerated PG algorithm developed for estimating $S_m$.

DETAILED DESCRIPTION OF SOME EMBODIMENTS

Figure 1:
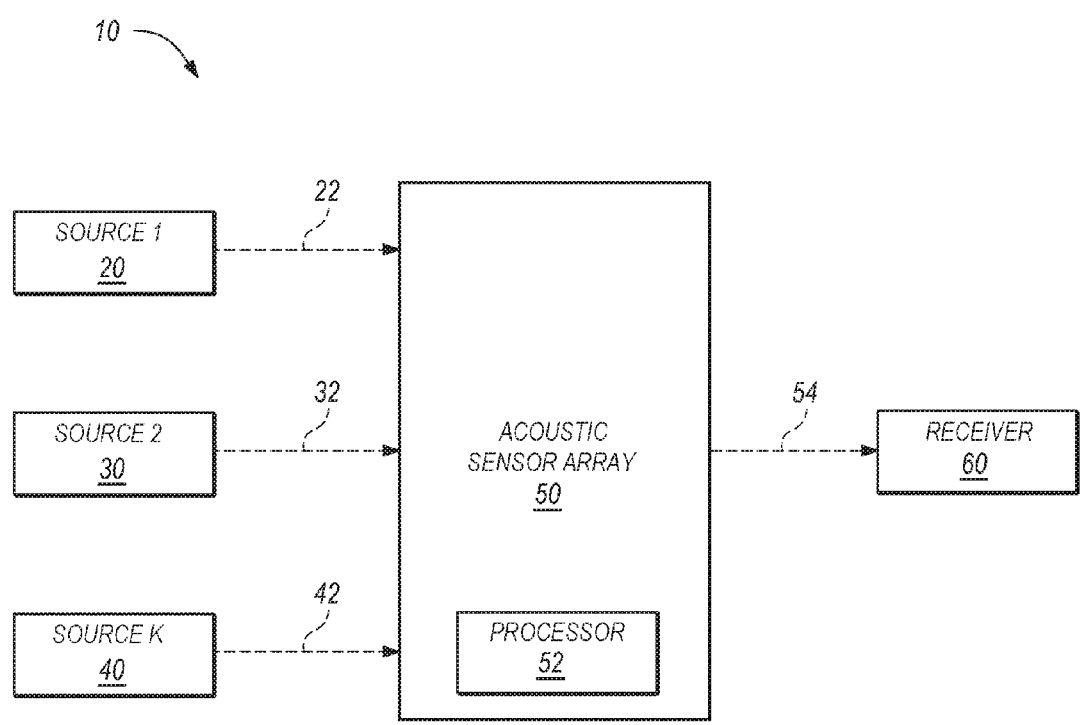
FIG. 1 shows a block diagram of an embodiment of a system in accordance with the Passive Tracking of Acoustic Sources with Sparse Innovations.

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The embodiments disclosed herein use sparse-signal modeling tools to develop a broadband tracking algorithm for multiple underwater acoustic sources that effectively tracks the broadband source-location map (SLM) as it evolves over time. Spectral data from multiple frequency bands are processed 'coherently' so as to unambiguously agree on the source locations across frequencies. The tracking problem is cast so that the sparsity inherent in the SLM and in the SLM-innovations can be exploited. A numerical solver based on the proximal gradient (PG) method and the alternating directions method of multipliers (ADMM) is developed for SLM estimation.

Passive sonar enables monitoring and surveillance systems to operate without radiating sound into the water; hence, it is often employed in applications where concealment and low environmental impact are desired. Acoustic data collected over time can be used for sketching source tracks by, for example, plotting source-location estimates over time. Tracking capitalizes on the temporal structure inherent to source tracks, which are always constrained by the kinematic features of the source, to improve source-location estimates. However, using classical tracking methods, such as Kalman filtering or Matched-field tracking (MFT), to develop a passive acoustic tracker poses significant computational challenges.

MFT is a passive acoustic tracking approach that builds on a generalized underwater beamforming technique called matched-field processing (MFP). MFP postulates a grid of tentative source locations and relies on an acoustic propagation model to obtain model-predicted acoustic pressures, hereafter referred to as replicas, at an array of hydrophones. Replicas are "matched" to acoustic measurements collected by an array of hydrophones to construct a surface that summarizes the acoustic-power estimates across each of the grid locations.

MFT relies on a sequence of ambiguity surfaces obtained at consecutive time intervals for constructing tracks. Note that these ambiguity surfaces are constructed independently from each other without exploiting their temporal correlation. Then, MFT constructs a graph connecting grid points on consecutive ambiguity surfaces. Each possible path over this graph connecting the initial and final ambiguity surface is scored based on, e.g., its average ambiguity surface value, and the path with the largest score serves as a track estimate. Unfortunately, the complexity of MFT grows quickly with the size of the grid and the number of ambiguity surfaces used. Constraints obtained from the source's kinematics are often used to limit the number of tracks to be explored.

Sparsity-driven Kalman-filter approaches can be used for tracking acoustic sources over a grid. In these approaches, the entire grid takes the place of the state variable. It is presumed that only a few entries of the grid, that is, those corresponding to the locations of the sources, take nonzero values. Thus, the state variable is considered to be sparse. Unfortunately, the high dimensionality of the grid renders impractical any tracker that computes the full covariance matrix of the state variable.

The broadband tracking approach disclosed herein builds on the sparsity-driven framework outlined above. It aims to construct sparse source location maps (SLMs), one per frequency, while exploiting their temporal dependence. Only those grid points whose locations correspond to a source location take a nonzero value, which represents the complex-valued acoustic signature of the source. The tracker guarantees the support of the various grids to coincide, thereby assuring unambiguous source location estimates across frequencies. Different from Kalman-based trackers, our tracker relies on prior SLM estimates only.

An innovation is defined as a change in the support of consecutive SLMs. The proposed tracker controls the number of innovations allowed to occur. It is assumed that innovations are sparse, and thus few sources change their location between consecutive SLMs. The disclosed embodiments involve a broadband tracker in which source-location information is shared across frequencies. The resulting complex-valued optimization problem features a compounded regularizer that encourages sparse SLMs and sparse innovations. Iterative solvers based on a combination of the PG method and ADMM are developed.

FIG. 1 shows a block diagram of an embodiment of the operational concept of a system in accordance with the Passive Tracking of Acoustic Sources with Sparse Innovations. System 10 includes K acoustic sources 20, 30, and 40 each radiating sound underwater. Although the acoustic sources are presumed to be mobile, thus justifying the dependence of their locations $\{r_k(\tau)\}_{k=1}^K$ on the time $\tau \in \mathbb{N}$, no assumptions about their kinematics are made. Each $r_k(\tau) \in \mathbb{R}^d$ is given in cylindrical coordinates comprising the source's range, depth (with respect to the sea surface), and azimuth, with $d \in \{1,2,3\}$.

An acoustic sensor array 50 detects acoustic signals 22, 32, and 42 from sources 20, 30, and 40, respectively. As an example, an acoustic sensor array 50 is an array of N hydrophones with known and arbitrary geometry, where N>0. Array 50 is used to collect a time series of acoustic pressure vectors $\{y(\tau) \in \mathbb{R}^N : \tau \in \mathbb{N}\}$ with entries $[y(\tau)]_n \in \mathbb{R}$ denoting the acoustic pressure measured by the n-th hydrophone in the array at time $\tau$. Note that although the framework is agnostic to the specific geometry of the array, its geometry affects the definition of source location. For instance, data gathered with an array that features horizontal aperture but no vertical aperture primarily provides information about the sources' azimuth only (d=1), although source range and depth can be determined depending on the closeness of the source to the end fire direction, the length of the array, and the bandwidth considered. On the other hand, data collected on a vertical array with no horizontal aperture provide information on the source range and depth only (d=2), unless the bathymetry is not flat. Data gathered with an array featuring vertical and horizontal aperture provides information about the sources' range, depth, and azimuth (d=3).

Localization and tracking algorithms that use $\{y(\tau) : \tau \in \mathbb{N}\}$ directly are often challenged by the high sampling and computational requirements necessary to reconstruct the channel impulse responses between the source locations and the hydrophones. Instead, this work develops a frequency-based passive-tracking approach that does not require estimating the channel impulse responses. To this end, $\{y(\tau) : \tau \in \mathbb{N}\}$ is sequentially processed per hydrophone by computing short-time Fourier transforms (STFT) of length $T_0$. Consecutive blocks of the acoustic-pressure time series data can overlap and be scaled (per hydrophone) by a carefully chosen window function so as to reduced sidelobes and decrease the variability in the spectrum of the acoustic-pressure series due to noise. Fourier coefficients at F frequencies $\{\omega_f\}_{f=1}^F$ across the N hydrophones are gathered in $Y^m := [y_1^m, \ldots, y_F^m] \in \mathbb{C}^{N \times F}$, where $[Y^m]_{n,f} \in \mathbb{C}$ denotes the Fourier coefficient corresponding to $\omega_f$ for the n-th hydrophone in the m-th STFT block.

Each $y_f^m$ is modeled as $$y_f^m = \Sigma_{k=1}^K s_{k,f}^m \bar{p}_{k,f} + \epsilon_f^m, \forall m, f, \quad \text{(Eq. 1)}$$

where $s_{k,f}^m \in \mathbb{C}$ denotes the Fourier coefficient at $\omega_f$ of the acoustic signature of the k-th source obtained by the m-th STFT, $\bar{p}_{k,f} \in \mathbb{C}^N$ the model-predicted Fourier coefficient vector at the array for the k-th source at frequency $\omega_f$ normalized so that $\|\bar{p}_{k,f}\|_2 = 1$, and $\epsilon_f^m$ the spectral components of the array's measurement noise at $\omega_f$ for the m-th STFT block. The replicas $\bar{p}_{k,f}$'s are obtained using a model that characterizes the acoustic propagation environment and the geometry of the array.

Given K, the goal of the spectral passive-acoustic tracking problem is to recursively estimate the locations $\{r_k(\tau_M)\}_{k=1}^K$ of the acoustic sources 20, 30, and 40 at $\tau_M = \lfloor (1-\alpha)T_0 M \rfloor$ based on the sequence of Fourier coefficient matrices $\{Y^m\}_{m=0}^M$, where $\alpha \in [0,1)$ denotes percentage of overlap between consecutive STFT blocks. Note that here $\tau_M$ denotes the time index corresponding to the beginning of the M-th temporal acoustic-data block. Even if all $s_{k,f}^m$'s were known, finding $\{r_k(\tau_M)\}_{k=1}^K$ based on (Eq. 1) is challenging due to the non-linear relationship between each $r_k(\tau_M)$ and its corresponding $\bar{p}_{k,f}$, a relationship that in most cases is not available in closed form.

In some embodiments, the estimation of the locations of the acoustic sources is performed by a processor 52 embedded within acoustic sensor array 50, with the results being transmitted, via signal 54, to receiver 60. In some embodiments, acoustic sensor array sends, via signal 54, the signal measurements to receiver 60, which performs the required processing.

Figure 2:
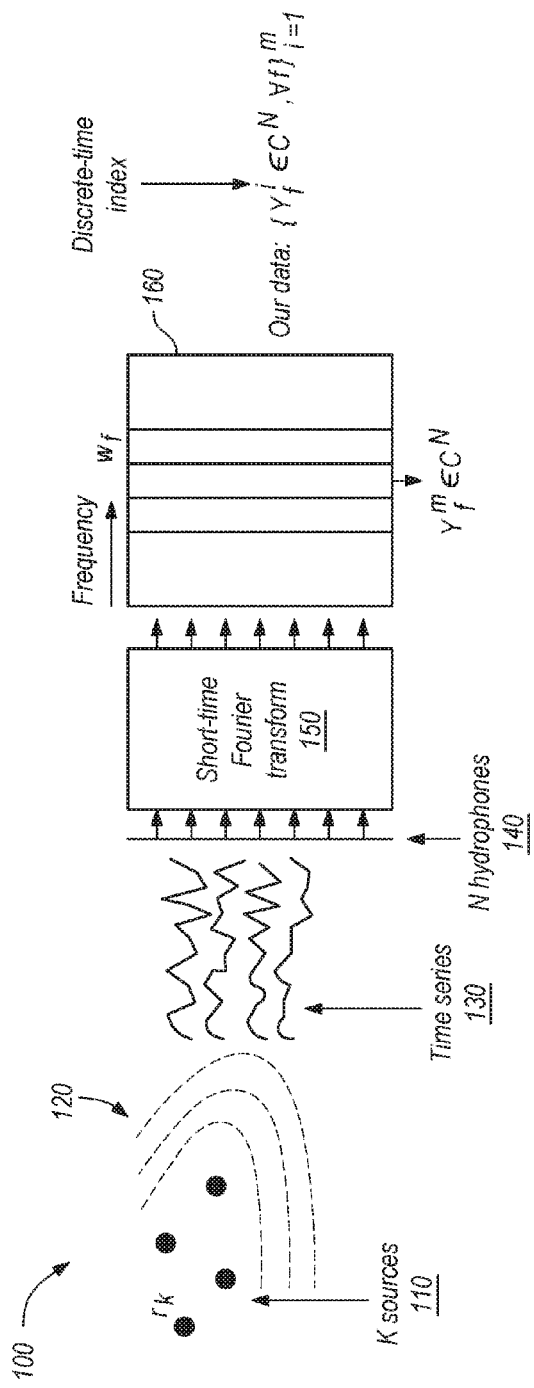
FIG. 2 shows a diagram of an embodiment of a data collection model used in accordance with the Passive Tracking of Underwater Acoustic Sources with Sparse Innovations.

As shown in diagram 100 of FIG. 2, acoustic sources 110 generate acoustic signals 120 that propagate through the propagation environment towards the acoustic sensor array 140, which is this case is a hydrophone array. Acoustic signals are collected by the hydrophone array 140 as a time series 130 of acoustic pressures. The times series data captured by each hydrophone in the array 140 is transformed to the Fourier domain via a short-time Fourier transform (STFT) processing step 150 yielding Fourier coefficients. The Fourier coefficients obtained across hydrophones for a set of F frequencies $\{\omega_1, \ldots, \omega_F\}$ are grouped to construct Fourier coefficient vectors $y_{m,f} \in \mathbb{C}^N$ at the end of processing step 160.

Figure 3:
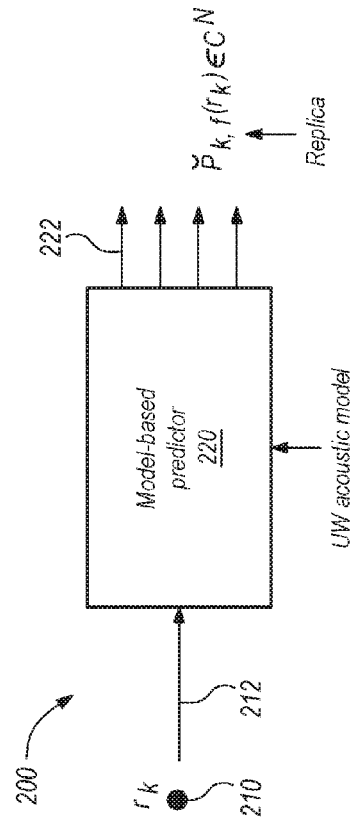
FIG. 3 shows a flowchart of an embodiment of a replica generation model in accordance with the Passive Tracking of Acoustic Sources with Sparse Innovations.

Referring to FIG. 3, diagram 200 shows an embodiment of a model-based prediction component, where a postulated source location 210 is input 212 into a model-based predictor 220. Based upon an acoustic model, such as an underwater acoustic model characterizing the true propagation environment, predictor 220 yields replica vectors 222. Replicas are model-based predicted vectors of Fourier coefficients that are used by the Passive Tracking of Acoustic Sources with Sparse Innovations to model the $y_{m,f}$'s and determine the source localizations.

Figure 4:
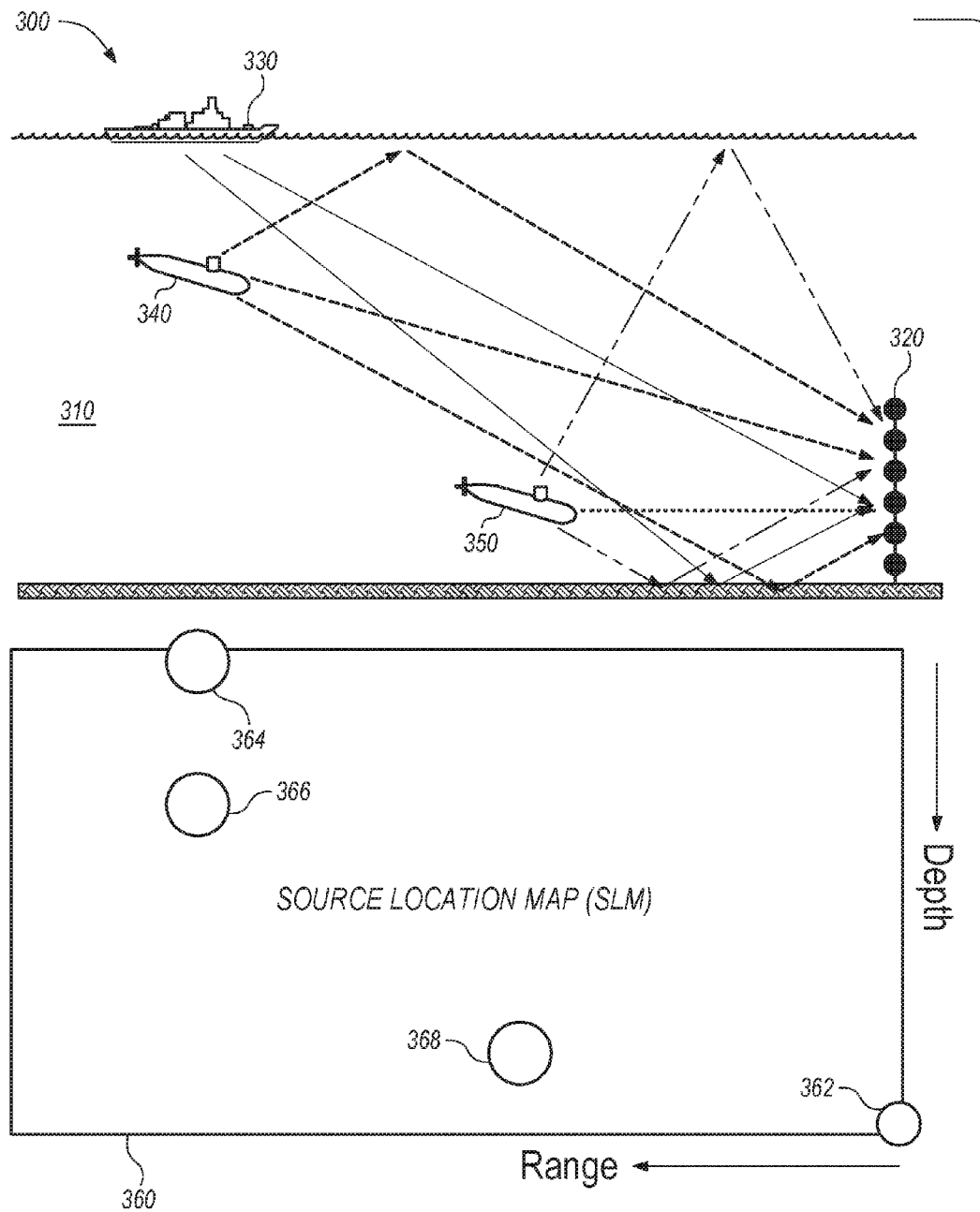
FIG. 4 shows a diagram illustrating an example of an operational environment and corresponding source location map.

FIG. 4 shows a diagram 300 illustrating an example of an operational environment and the desired SLM. As shown, an underwater environment 310 includes a sensor array 320 disposed on the seafloor, a ship 330 on the surface of the water, and submarines 340 and 350 located underwater. An SLM 360 includes a marker 362 representing the location of sensor array 320, a marker 364 representing the estimated location of ship 330, a marker 366 representing the estimated location of submarine 340, and a marker 368 representing the estimated location of submarine 350.

A model for the $y_f^m$'s that alleviates the challenges associated with the nonlinearities inherent to (Eq. 1) is proposed next. Let $\mathcal{G} := \{r_g \in \mathbb{R}^d\}_{g=1}^G$, with $G \gg \max\{N, KF\}$, denote a grid of tentative source locations over the region of interest. Each $y_f^m$ is now modeled as $$y_f^m = \sum_{g=1}^G s_{g,f}^m p_{g,f} + \epsilon_{m,f} \ \forall f, \quad \text{(Eq. 2)}$$

where $s_{g,f}^m$ denotes the unknown Fourier coefficient associated to the acoustic signature at frequency $\omega_f$ for a source located at $r_g$, $p_{g,f} \in \mathbb{C}^N$ is the replica for $\omega_f$ corresponding to a source located at $r_g$ normalized so that $\|p_{g,f}\|_2 = 1$ and $\epsilon_{m,f}$ denotes the Fourier coefficients at $\omega_f$ corresponding to the noise in the m-th block.

It should be noted that (Eq. 2) tacitly assumes that the acoustic sources are located exactly on some $r_g \in \mathcal{G}$. Since $G \gg KF$, most of the $s_{g,f}^m$'s are expected to be zero at any given m. Only coefficients $s_{g,f}^m$ that correspond to the location of the acoustic sources take nonzero values, and thus their corresponding replicas participate in (Eq. 2). All $s_{g,f}^m$'s associated to locations where acoustic sources are absent are set to zero.

From the vantage point of (Eq. 2), finding estimates for $\{r_k(\tau_M)\}_{k=1}^K$ is tantamount to identifying the locations in $\mathcal{G}$ corresponding to the nonzero $s_{g,f}^m$'s. Let $(\cdot)'$ denote the transpose operator and $s_f^m := [s_{1,f}^m, \ldots, s_{G,f}^m]' \ \forall f$. Once an estimate for $S^m := [s_1^m, \ldots, s_F^m] \in \mathbb{C}^{G \times F}$ is available, one can construct the broadband SLM. This can be done by, e.g., plotting the pairs $(r_g, \|\varsigma_g^m\|_2)$ for all $r_g \in \mathcal{G}$, where $\varsigma_g^m := [s_{g,1}^m, \ldots, s_{g,F}^m]' \in \mathbb{C}^F$ comprises the entries of the g-th row of $S_m$. Source location estimates $\{\hat{r}_k(\tau_m)\}_{k \in \mathcal{K}}$ indexed by the index-set $\mathcal{K} \subset \{1, \ldots, K\}$ are given by the locations that correspond to the K-largest entries in the map, that is $$\mathcal{K} \in \underset{|\mathcal{K}|=K}{\arg\max} \sum_{k} \|\varsigma_k\|_q \quad \text{(Eq. 3)}$$

A localization algorithm that exploits the inherent sparse structure of $S^m$ was previously proposed by Forero. This approach estimates $S^m$ using $\{y_f^m\}_{f=1}^F$ only, while enforcing a common-support across all its columns $\{s_f^m\}_{f=1}^F$. The requirement on the support of $S_m$ is justifiable since it is assumed that the acoustic signal radiated by each source spans all $\{\omega_f\}_{f=1}^F$. Nevertheless, such an estimator for $S_m$ does not capture the temporal dependencies inherent to source motion that are caused by the physical constraints on the kinematics of the acoustic sources.

An iterative estimator for $S^m$ is disclosed herein. The distinctive feature of this estimator is that it uses the previously estimated $S^{m-1}$ to capture the temporal evolution of the source locations. At $\tau_m$, $S^m$ is obtained as the solution of the following regularized least-squares problem $$\min_{S \in \mathbb{C}^{G \times F}} \frac{1}{2} \sum_{f=1}^F \|y_f^m - P_f s_f\|_2^2 + \sum_{g=1}^G [\mu \|\varsigma_g\|_2 + \lambda \|\varsigma_g - \varsigma_g^{m-1}\|_2], \quad \text{(Eq. 4)}$$

where $S := [s_1, \ldots, s_F] \in \mathbb{C}^{G \times F}$, $\varsigma'_g$ is the g-th row of S, $P_f := [p_{1,f}, \ldots, p_{G,f}] \in \mathbb{C}^{N \times G}$ is the matrix of replicas for $\omega_f$, and $\mu, \lambda > 0$ are tuning parameters. The regularization term in (Eq. 4) encourages both group sparsity on the rows of $S^m$ and sparsity in the innovations, that is, changes in the support between the SLMs at $\tau_{m-1}$ and $\tau_m$.

The first term of the regularizer promotes the common support for the columns of $S^m$. The tuning parameter $\mu$ controls the number of nonzero rows in $S^m$. The second term of the regularizer captures temporal information related to the previous SLM via the $\varsigma_g^{m-1}$'s. The number of innovations allowed to occur between $\tau_{m-1}$ and $\tau_m$ is controlled via $\lambda$.

FIG. 5 shows a diagram 400 of an embodiment of a broadband SLM 410 comprising a plurality of tentative locations (grid points) and an estimated source location 420 for q=2. Grid point 420 corresponds to a pair $(r_g, \|\boldsymbol{\varsigma}_g^m\|_2)$ that subsumes the corresponding location $r_g$ and the size of the corresponding regression coefficients $\boldsymbol{\varsigma}_g$ associated to that location across frequencies $\{\omega_f\}_{f=1}^F$. Although only one estimated source location 420 is shown for SLM 410, other SLMs may contain additional estimated source locations 420.

FIG. 6 shows a diagram 500 of the structure of the regression coefficient matrix S 510. Once an estimate for S has been obtained, its columns can be used to construct SLMs over $\mathcal{G}$ per $\omega_f$. Furthermore, a broadband SLM can be constructed using whole rows $\boldsymbol{\varsigma}_g \in \mathbb{C}^F$ 520 of S for each $r_g \in \mathcal{G}$. For instance, an SLM can be constructed by plotting the pairs $(r_g, \|\boldsymbol{\varsigma}_g\|_q)$ for all $r_g \in \mathcal{G}$ and q>1.

As stated in the below proposition, (Eq. 4) can be written as a real-valued convex optimization problem after representing all complex-valued variables by the direct sum of their real and imaginary parts. Before stating the proposition, the following notation is introduced $\check{y}_f^m := [\text{Re}(y_F^m)', \text{Im}(y_F^m)']'$, $\check{s}_f^m := [\text{Re}(s_F)', \text{Im}(s_F)']'$, $\check{S} := [\check{s}_1, \ldots, \check{s}_F]$, and $$\check{P}_f := \begin{bmatrix} \text{Re}(P_f) & -\text{Im}(P_f) \\ \text{Im}(P_f) & \text{Re}(P_f) \end{bmatrix} \quad (\text{Eq. 5})$$

where Re(•) (Im(•)) denotes the real-part (imaginary-part) operator. Matrix $\check{S}$ can be alternatively viewed in terms of its rows as $\check{S} = [\check{\boldsymbol{\varsigma}}_1, \ldots, \check{\boldsymbol{\varsigma}}_{2G}]'$ where the first (last) G rows correspond to the real (imaginary) parts of the rows of S.

The minimum of (Eq. 3) is equal to that of the following convex optimization problem $$\text{argmin}_{\check{S} \in \mathbb{R}^{2G \times F}} \frac{1}{2} \sum_{f=1}^{F} \|\check{y}_F^m - \check{P}_f \check{s}_f\|_2^2 + \quad (\text{Eq. 6})$$

$$\mu \sum_{g=1}^{G} \|\check{v}_g\|_2 + \lambda \sum_{g=1}^{G} \|\check{v}_g - \check{v}_g^{m-1}\|_2,$$

where $\check{v}_g := [\check{\boldsymbol{\varsigma}}'_g, \check{\boldsymbol{\varsigma}}'_{g+G}]' \in \mathbb{R}^{2F}$ ($\check{v}_g^{m-1}$) corresponds to the direct sum of the real and imaginary parts of $\boldsymbol{\varsigma}_g$ ($\boldsymbol{\varsigma}_g^{m-1}$). FIG. 7 shows a diagram 600 illustrating the structure of $\check{S}$. It comprises two blocks that correspond to the real part 610 of matrix S and the imaginary part 620 of matrix S. The minimizer $S^m$ of (Eq. 4) is given in terms of $\check{S}^m$ as $S^m = \check{S}_{1:G}^m + j\check{S}_{G+1:2G}^m$, where $j := \sqrt{-1}$ and $\check{S}_{g_1:g_2}^m = [\check{\boldsymbol{\varsigma}}_{g_1}, \ldots, \check{\boldsymbol{\varsigma}}_{g_2}]'$, for all $g_1 \le g_2$, $g_1, g_2 \in \{1, \ldots, G\}$.

Although (Eq. 6) is a convex optimization problem that can be solved via, e.g., interior point methods, such solver entails high computational complexity due to the large dimensionality of $\check{S}$ and fails to exploit the sparse structure of $\check{S}$. Discussed below is a PG solver for (Eq. 5) that exploits its sparse structure.

The problem in (Eq. 6) can be written as $\min_{\check{S}} h(\check{S}) + \theta(\check{S})$, where $$h(\check{S}) := \frac{1}{2} \sum_{f=1}^{F} \|\check{y}_f^m - \check{P}_f \check{s}_f\|_2^2$$

denotes the continuously differentiable portion of the cost, and $\theta(\check{S}) := \mu \sum_{g=1}^{G} \|\check{v}_g\|_2 + \lambda \sum_{g=1}^{G} \|\check{v}_g - \check{v}_g^{m-1}\|_2$ the non-differentiable portion of the cost. Note that the gradient of $h(\check{S})$ is Lipschitz continuous with Lipschitz constant $L_h := \max_{f=1,\ldots,F} \sigma_{max}(\check{P}'_f \check{P}_f)$, where $\sigma_{max}(\check{P}'_f \check{P}_f)$ denotes the largest singular value of $\check{P}'_f \check{P}_f$. That is, $\|\nabla h(\check{S}_1) - \nabla h(\check{S}_2)\|_2 \le L_h \|\check{S}_1 - \check{S}_2\|_F$, where $\nabla h(\check{S}_i)$ denotes the gradient of h with respect to $\check{S}$ evaluated at $\check{S}_i$.

Figures 8, 9:
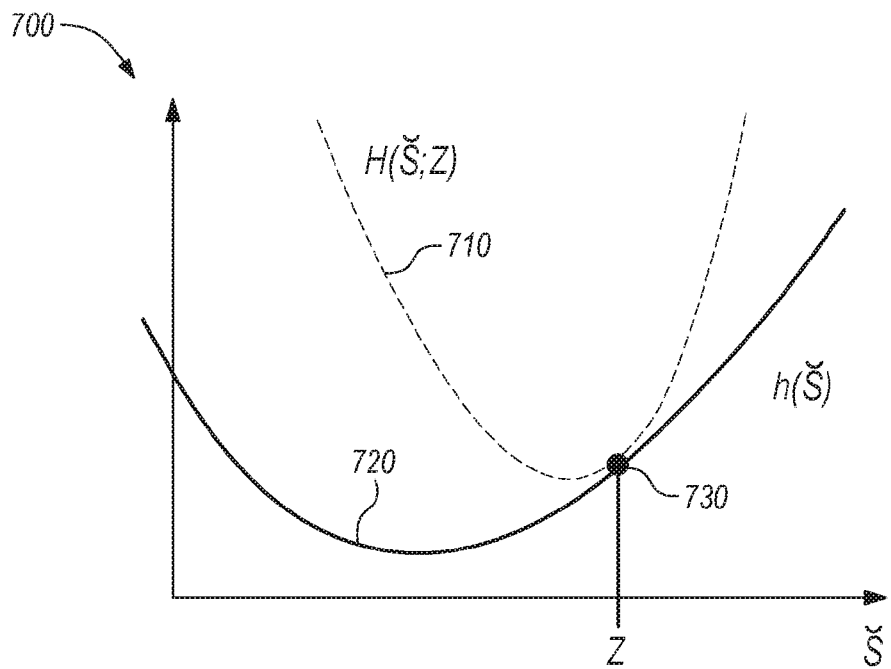
FIG. 8 shows a graph illustrating the concept of a majorizer used by the proximal gradient method.
FIG. 9 shows a diagram of an ADMM algorithm for computing the proximal gradient update for pairs of rows in Š that take nonzero values.

The PG method can be interpreted as a majorization-minimization method relying on a majorizer $H(\check{S}; Z)$ for h, where $Z := [z_1, \ldots, z_F] \in \mathbb{R}^{2G \times F}$ is an auxiliary matrix. The majorizer H satisfies: (i) $H(\check{S}; Z) \ge h(\check{S})$, $\forall(\check{S})$; and, (ii) $H(\check{S}; Z) = h(\check{S})$ for $Z = \check{S}$. The specific H used is $$H(\check{S}; Z) := h(Z) + \sum_{f=1}^{F} \nabla h_f(z_f)'(\check{s}_f - z_f) + \frac{L_h}{2}\|\check{S} - Z\|_F^2 \quad (\text{Eq. 7})$$

where $h_f(\check{s}_f) := 1/2 \|\check{y}_f^m - \check{P}_f \check{s}_f\|_2^2$, and $\nabla h_f(z_f)$ denotes the gradient of $h_f$ with respect to $\check{s}_f$ evaluated at $z_f$. That (Eq. 7) satisfies conditions (i) follows from the fact that the gradient of h is Lipschitz continuous, and that it satisfies (ii) follows after setting $Z = \check{S}$ in (Eq. 7). FIG. 8 shows a graph 700 illustrating a majorizer H 710 for the smooth function h 720. Note that the line intersection 730 illustrates condition (ii) above, that is, H must touch at the point $Z = \check{S}$. With j denoting the iteration index, the PG algorithm iteratively solves $$\check{S}^m[j] = \min_{\check{S}} \left[ H(\check{S}; \check{S}^m[j-1]) + \theta(\check{S}) \right]. \quad (\text{Eq. 8})$$

From an algorithmic point of view, it is convenient to write H as a function of the $\check{v}_g$'s. After performing some algebraic manipulations on H and dropping all terms independent of $\check{S}$, (Eq. 8) can be written as $$\check{S}^m[j] = \min_{\check{S}} \left[ \sum_{g=1}^{G} \frac{L_h}{2} \|\check{v}_g - w_g^m[j-1]\|_2^2 + \theta(\check{S}) \right], \quad (\text{Eq. 9})$$

where $$w_g^m[j-1] := \check{v}_g^m[j-1] - \left(\frac{1}{L_h}\right) d_g^m[j-1] \quad (\text{Eq. 10})$$

is a gradient-descent step, with step-size $$\frac{1}{L_h},$$

for the g-th row of $\check{S}$, and the entries of $d_g^m[j-1]$, which correspond to those of the gradient of $h_f$ with respect to $\check{v}_g$, are $$[D_g^m[j-1]]_f = \begin{cases} -\check{p}'_{g,f} r_f^m[j-1], & f = 1, \ldots, F \\ -\check{p}'_{g+G,f} r_f^m[j-1], & f = F+1, \ldots, 2F \end{cases} \quad (\text{Eq. 11})$$

where $r_f^m[j-1] := \check{y}_f - \check{P}_f \check{s}_f^m[j-1]$. Eq. 9 is often called the proximal operator of $\theta$ with parameter $$\frac{1}{L_h}.$$

Eq. 9 is decomposable across $\check{v}_g$'s. Per iteration j, the PG update in (Eq. 8) can be performed in parallel for every pair of rows of $\check{S}$ comprised in each $\check{v}_g$ via $$\tilde{v}_g^m[j] = \min_{\tilde{v}_g}\left[\frac{L_h}{2}\|\tilde{v}_g - w_g^m[j-1]\|_2^2 + \mu\|\tilde{v}_g\|_2 + \lambda\|\tilde{v}_g - \tilde{v}_g^{m-1}\|_2\right]. \quad (\text{Eq. }12)$$

The cost in (Eq. 12) is convex; however, it is non-differentiable due to the compounded regularization term. This regularizer is such that a closed-form update for $\check{v}_g^m[j]$ in general is not available. Thus, (Eq. 12) must be solved numerically while bearing in mind that the computational cost associated to each PG iteration hinges on that of solving (Eq. 12). Note that (Eq. 12) can be solved in closed form for the special case where $\check{v}_g^{m-1}=0_{2F}$, where $0_{2F}$ is a 2F×1 vector of zeros, and its solution in this case is $$\tilde{v}_g^m[j] = w_g^m[j-1]\left(1 - \frac{\lambda+\mu}{L_h\|w_g^m[j-1]\|_2}\right)_+ \quad (\text{Eq. }13)$$

where $(\bullet)_+ = \max\{0, \bullet\}$.

To gain further insight into the solution of (Eq. 12), when $\check{v}_g^{m-1} \neq 0_{2F}$, the Karush-Kuhn-Tucker (KKT) conditions may be used combined with the notion of subdifferential to characterize $\check{v}_g^m[j]$. With $V^m(\check{v}_g)$ denoting the cost in (Eq. 12) and since (Eq. 12) is an unconstrained optimization problem, the KKT optimality conditions state that $0_{2F} \in \partial V^m(\check{v}_g^m[j])$ where $\partial V^m(\check{v}_g)$ denotes the subdifferential of $V_m$ evaluated at $\check{v}_g$. The following necessary and sufficient conditions for $\check{v}_g^m[j]$ follow readily from the optimality condition.

When $\check{v}g^{m-1} \neq 0_{2F}$, the following mutually-exclusive conditions about (Eq. 12) hold $$\tilde{v}_g^m[j] = 0_{2F} \Leftrightarrow \|w_g^m[j-1] + \alpha_g^{m-1}\tilde{v}_g^{m-1}\|_2 \leq \frac{\lambda}{L_h} \quad (\text{Eq. }14a)$$

$$\tilde{v}_g^m[j] = \tilde{v}_g^{m-1} \Leftrightarrow \|w_g^m[j-1] + \beta_g^{m-1}\tilde{v}_g^{m-1}\|_2 \leq \frac{\mu}{L_h} \quad (\text{Eq. }14b)$$

where $\alpha_g^{m-1} = \mu/L_h\|\check{v}_g^{m-1}\|_2$ and $\beta_g^{m-1} = 1 + \lambda/L_h\|\check{v}_g^{m-1}\|_2$.

The above equations can be used to quickly screen whether $\check{v}^m[j]$ equals $0_{2F}$ or $\check{v}^{m-1}$. If neither of these conditions is satisfied, then $\check{v}^m[j]$ must be obtained by solving (Eq. 12) numerically.

An efficient iterative solver for (Eq. 12) based on ADMM is developed in this section. To this end, consider the following optimization problem, which is equivalent to (Eq. 12), $$\min_{\tilde{v}_g, \zeta_g} \frac{L_h}{2}\|\tilde{v}_g - w_g^m[j-1]\|_2^2 + \mu\|\tilde{v}_g\|_2 + \lambda\|\zeta_g\|_2 \quad (\text{Eq. }15)$$

$$\text{Subj. to } \zeta_g = \tilde{v}_g - \tilde{v}_g^{m-1}.$$

The ADMM solver for (Eq. 15) relies on the augmented Lagrangian given by $$\mathcal{L}(\tilde{v}_g, \zeta_g, \gamma_g) = \frac{L_h}{2}\|\tilde{v}_g - w_g^m[j-1]\|_2^2 + \mu\|\tilde{v}_g\|_2 + \quad (\text{Eq. }16)$$

$$\lambda\|\zeta_g\|_2 + \gamma_g'(\zeta_g - \tilde{v}_g + \tilde{v}_g^{m-1}) + \frac{\eta}{2}\|\zeta_g - \tilde{v}_g + \tilde{v}_g^{m-1}\|_2^2$$

where $\eta > 0$ is a tuning parameter, and $\gamma_g$ the Lagrange multiplier vector associated to the equality constraint in (Eq. 15). With i denoting an iteration index, the ADMM iterations are $$\tilde{v}_g[i] = \underset{\tilde{v}_g}{\operatorname{argmin}} \mathcal{L}(\tilde{v}_g, \zeta_g[i-1], \gamma_g[i-1]) \quad (\text{Eq. }17a)$$

$$\zeta_g[i] = \underset{\zeta_g}{\operatorname{argmin}} \mathcal{L}(\tilde{v}_g[i], \zeta_g, \gamma_g[i-1]) \quad (\text{Eq. }17b)$$

$$\gamma_g'[i] = \gamma_g'[i-1] + \eta(\zeta_g[i] - \tilde{v}_g[i] + \tilde{v}_g^{m-1}) \quad (\text{Eq. }17c)$$

The following equations show that updates to (Eq. 17a) and (Eq. 17b) can be obtained in closed form via soft-thresholding, as they can be performed in closed form as $$\tilde{v}_g[i] = \frac{\rho_g^{m-1}[i-1]}{L_h + \eta}\left(1 - \frac{\mu}{\|\rho_g^{m-1}[i-1]\|_2}\right)_+ \quad (\text{Eq. }18a)$$

$$\zeta_g[i] = \frac{\chi_g^{m-1}[i-1]}{\eta}\left(1 - \frac{\lambda}{\|\chi_g^{m-1}[i-1]\|_2}\right)_+ \quad (\text{Eq. }18b)$$

where $\rho_g^{m-1}[i-1] := \eta(\zeta_g[i-1] + \tilde{v}_g^{m-1} + L_h \cdot w_g^m[j-1]) + \gamma_g[i-1]$ and $\chi_g^{m-1}[i-1] := \eta(\tilde{v}_g[i] - \tilde{v}_g^{m-1}) - \gamma_g[i-1]$.

The resulting ADMM algorithm is summarized as Algorithm 1 shown in diagram 800 of FIG. 9. Per iteration, its computational complexity is dominated by the evaluation of the Euclidean norms in (Eqs. 18a and 18b), which require O(F) time complexity. With respect to the convergence of Algorithm 1, note that the sequence $\{\tilde{v}_g[i]\}_{i>0}$ does not need to converge to the optimal value of $\check{v}_g$. Nevertheless, the results can be used to show that every limit point of $\{\tilde{v}_g[i]\}_{i>0}$ corresponds to an optimal solution of (Eq. 14), and that the sequence $\{\|\zeta_g[i] - \tilde{v}_g[i] - \tilde{v}_g^{m-1}\|_2\}_{i>0}$ converges to zero, i.e., iterates $\tilde{v}_g[i]$ and $\zeta_g[i]$ approach feasibility as i→∞.

The resulting tracking PG algorithm is summarized as Algorithm 2 shown in diagram 900 of FIG. 10. In general, its per-iteration computational complexity is dominated by the execution time of Algorithm 1 (line 12). Note, however, that Algorithm 1 is used only when $\check{v}_g^m[j] \notin \{0_{2F}, \check{v}_g^{m-1}\}$ and $\check{v}_g^{m-1} \neq 0_{2F}$. Due to the high-sparsity regime in which Algorithm 2 operates, few executions of Algorithm 1 are required. When Algorithm 1 is not executed, its computational complexity is dominated by the update in (Eq. 10) which entails O(NG) operations.

Algorithm 2 can be shown to converge to the solution of (Eq. 6) while featuring a worst-case convergence rate of O(1/j). Thus its convergence may be slow in practice, requiring up to several hundreds of iterations to achieve a highly accurate solution. Recent works have shown that it is possible to improve the suboptimal convergence rate of the PG method while maintaining its computational simplicity. These works propose to develop accelerated PG algorithms that feature worst-case convergence rate of $O(1/j^2)$.

FIG. 11 shows a diagram 1000 of Algorithm 3, which is an accelerated PG (APG) algorithm developed for solving the problem in Eq. 6. Different from Algorithm 2, the APG algorithm updates Š$^m$[j] based on a slack variable Σ[j] constructed as a linear combination of the previous two estimates for Š$^m$. These update is computed similarly to that described for the PG algorithm as shown in FIG. 10. Note that the added time and space complexity of the accelerated PG algorithm can be considered negligible, especially after recalling that both Š$^m$[j] and Š$^m$[j−1] are sparse.

Figure 12:
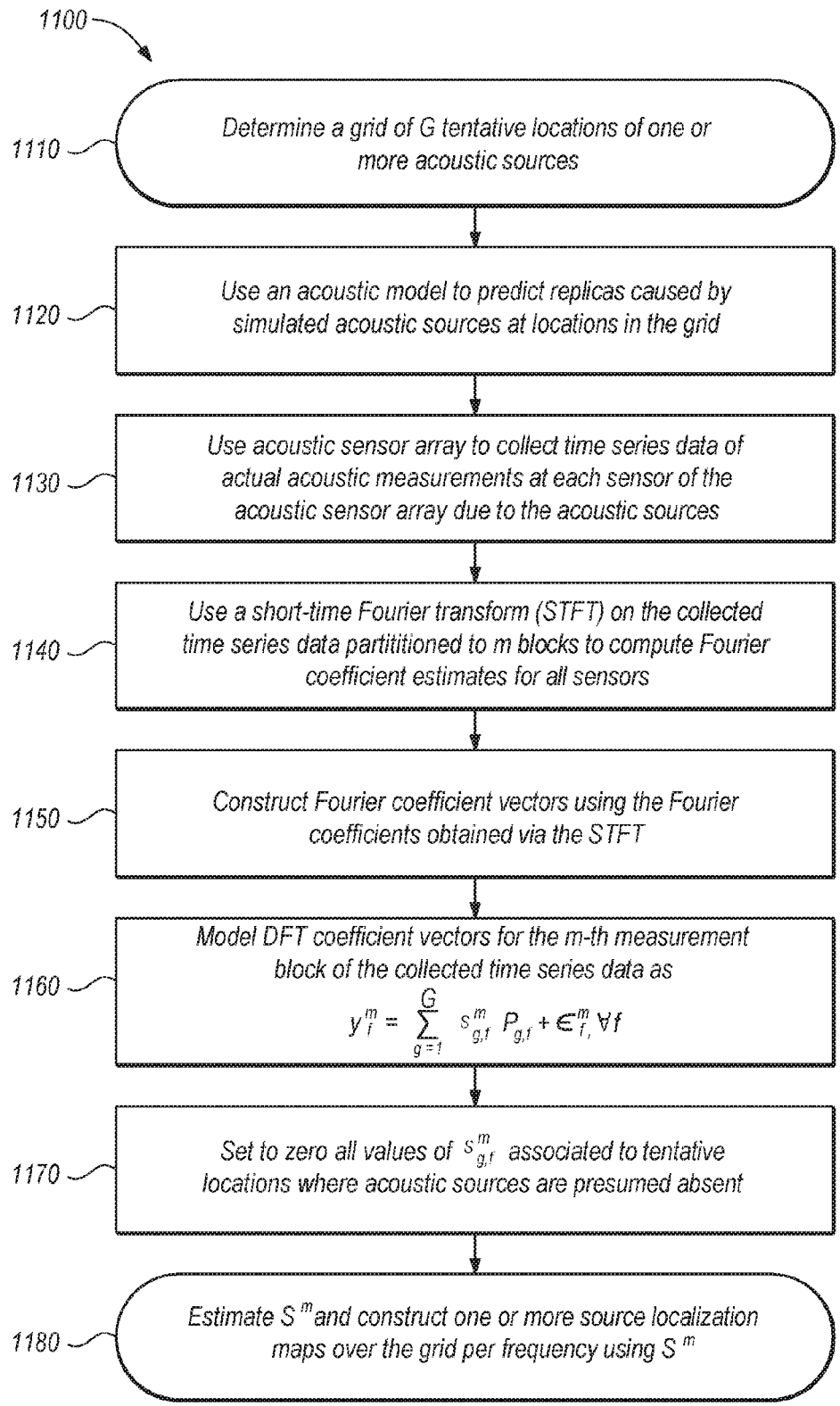
FIG. 12 shows a flowchart of an embodiment of a method in accordance with the Passive Tracking of Acoustic Sources with Sparse Innovations.

FIG. 12 shows a flowchart of an embodiment of a method 1100 in accordance with the Passive Tracking of Underwater Acoustic Sources with Sparse Innovations. As an example, method 1100 may be performed by system 10, 100, and 200 as shown in FIGS. 1-3. Also, while FIG. 12 shows one embodiment of method 1100 to include steps 1110-1180, other embodiments of method 1100 may contain fewer or more steps. Further, while in some embodiments the steps of method 1100 may be performed as shown in FIG. 12, in other embodiments the steps may be performed in a different order, or certain steps may occur simultaneously with one or more other steps. Additionally, some or all of the steps of method 1100 may be performed by processor 52 embedded within acoustic sensor array 50, by receiver 60, or by other processing means operatively connected to acoustic sensor array 50.

Method 1100 may begin with step 1110, which involves defining a grid $\mathcal{G}$ of G tentative locations $r_g$, to localize more than one acoustic sources, based on the location of an acoustic sensor array 50, where up to K acoustic sources 20, 30, and 40 are presumed to be located. In some embodiments step 1110 includes the step of estimating the number of acoustic sources, while in other embodiments the number of acoustic sources is predetermined.

Step 1120 involves using an acoustic model to compute, via the model-based predictor 220, replicas that correspond to simulated acoustic sources at locations in $\mathcal{G}$, wherein the replicas are model-predicted Fourier coefficient vectors at F frequencies $\{\omega_f\}_{f=1}^F$ corresponding to the acoustic pressure field 120 as sampled by an acoustic sensor array 140 having N sensors. Step 1130 involves collecting, using acoustic sensor array 140, time series data 130 of actual acoustic measurements at each sensor of the acoustic sensor array caused by the acoustic sources 110.

Method 1100 may proceed to step 1140, which involves using a short-time Fourier transform (STFT) 150 on the collected time series data 130 partitioned to m blocks to compute Fourier coefficient estimates at frequencies $\{\omega_f\}_{f=1}^F$ for all N sensors. Step 1150 involves constructing a set of Fourier coefficient vectors $Y^m := [y_1^m, \ldots, y_F^m] \in \mathbb{C}^{N \times F}$, where $[Y^m]_{n,f} \in \mathbb{C}$ denotes the Fourier coefficient corresponding to $\omega_f$ for the n-th sensor in the m-th STFT block, at step 1160 using the Fourier coefficients previously obtained via the STFT.

Step 1160 involves modeling Fourier coefficient vectors at $\omega_f$ for the m-th measurement block of the collected time series data as $y_f^m = \sum_{g=1}^G s_{g,f}^m p_{g,f} + \epsilon_{m,f}$, ∀f, where $s_{g,f}^m$ denotes the unknown Fourier coefficient associated to the acoustic signature at frequency $\omega_f$ for a source located at $r_g$, $p_{g,f} \in \mathbb{C}^N$ is the replica for $\omega_f$ corresponding to a source located at $r_g$ normalized so that $\|p_{g,f}\|_2 = 1$, and $\epsilon_{m,f}$ denotes the Fourier coefficients at $\omega_f$ corresponding to the noise in the m-th block.

Step 1170 involves setting to zero all values of $s_{g,f}^m$ associated to tentative locations $r_g$ where acoustic sources are presumed to be absent. Step 1170 is an optional step that may or may not appear in all embodiments of the methods disclosed herein. It relies on so-called predictor screening rules that can identify with certainty points in $\mathcal{G}$ where acoustic sources are absent. A specific embodiment of a predictor-screening rule is described in the commonly-assigned U.S. patent application Ser. No. 14/285,400, entitled "Multitask Learning Method for Broadband Source-Location Mapping of Acoustic Sources."

Step 1180 involves obtaining, at time $\tau_m$, an estimate $S_m$ as the solution to $$\min_{S \in \mathbb{C}^{G \times F}} \frac{1}{2} \sum_{f=1}^F \|y_f^m - P_f s_f\|_2^2 + \sum_{g=1}^G \left[\mu \|\varsigma_g\|_2 + \lambda \|\varsigma_g - \varsigma_g^{m-1}\|_2\right],$$

where $S := [s_1, \ldots, s_F] \in \mathbb{C}^{G \times F}$, $\varsigma'_g$ is the g-th row of S, $P_f := [p_{1,f}, \ldots, p_{G,f}] \in \mathbb{C}^{N \times G}$ is the matrix of replicas for $\omega_f$, and $\mu, \lambda > 0$ are tuning parameters. In some embodiments, the estimate of $S^m$ in step 1180 is obtained via Algorithm 2 shown in FIG. 10. Step 1180 also involves generating one or more SLMs over $\mathcal{G}$ per frequency $\omega_f$ using $S^m$, wherein each location on a particular SLM is associated with the magnitude of its corresponding acoustic gain estimate $|\hat{s}_{g,f}|$, wherein estimates of the actual locations of the K acoustic sources, $\{\hat{r}_k(\tau_m)\}_{k \in \kappa}$, correspond to the locations of the K-largest coefficients $|\hat{s}_{g,f}|$ depicted in the SLM. In some embodiments of step 1180, the SLMs are generated using an iterative problem solver based upon a PG method.

In some embodiments, step 1180 involves generating SLMs over $\mathcal{G}$ per frequency $\omega_f$ using each column $s_f$ of $S^m$ to construct the SLMs per frequency $\omega_f$. In some embodiments, step 1180 involves generating a broadband SLM over $\mathcal{G}$ comprising all frequencies $\omega_f$ used to compute $S^m$ using a whole row of $S^m$ for each $r_g \in \mathcal{G}$. In some embodiments of step 1180, generating SLMs over $\mathcal{G}$ per frequency $\omega_f$ involves generating a broadband SLM over $\mathcal{G}$ using $S^m$ by plotting the pairs $(r_g, \|\varsigma_g^m\|_2)$ for all $r_g \in \mathcal{G}$, where $\varsigma_g^m := [s_{g,1}^m, \ldots, s_{g,F}^m]' \in \mathbb{C}^F$ comprises the entries of the g-th row of $S^m$.

Method 1100 may be implemented as a series of modules, either functioning alone or in concert, with physical electronic and computer hardware devices. Method 1100 may be computer-implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Figure 13:
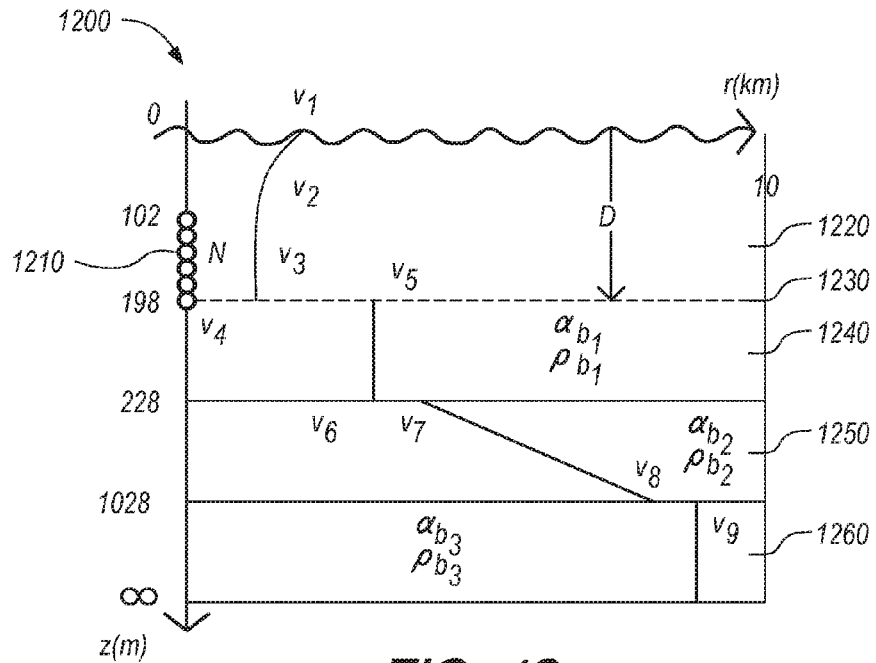
FIG. 13 shows a diagram of the propagation model used to characterize the propagation environment of SWellEX-3.

The performance of the proposed broadband tracking algorithm is illustrated on the third Shallow-Water Evaluation Cell Experiment (SWellEX-3) dataset. The environment considered corresponds to the one in the third Shallow-Water Evaluation Cell Experiment (SWellEX-3), see diagram 1200 shown in FIG. 13. In SWellEX-3, a towed source transmitting at frequencies $\{53+16\ k\}_{k=0}^{9}$ Hertz and a vertical line array 1210 collecting acoustic data were used. In this analysis, only 9 hydrophones, out of 64 hydrophones available, were used. These hydrophones were 11.25 m apart, having a total aperture of 90 m with the bottom element 6 m above the seafloor (water depth was 198 m).

A grid with G=20,000 locations spanning radial distances 0-10 km and depths 0-198 m was used, as shown by the top portion of the diagram 1220 ending at a depth of 198 m at line 1230. Depths between 198 m-228 m are represented by portion 1240, depths between 228 m-1028 m are represented by portion 1250, and depths below 1028 m are represented by portion 1260. The grid's radial and vertical spacing were 50 m and 2 m, respectively. All replicas were computed with the KRAKEN normal-mode propagation model using the environmental model shown in FIG. 13.

Sample parameter values used in the model are: $v_1$=1; 520 m/s, $v_2$32 1; 498 m/s, $v_3$=1; 490 m/s, $v_4$32 1;490 m/s, $v_5$=1; 572 m/s, $v_6$=1; 593 m/s, $v_7$=1; 881 m/s, $v_8$=3.246 m/s, $v_9$5; 200 m/s, $\alpha_{b_1}$=0.2 dB/m/kHz, $\alpha_{b_2}$=0.06 dB/m/kHz, $\alpha_{b_3}$=0.02 dB/m/kHz, $\rho_{b_1}$=1.76 g/cm3, $\rho_{b_2}$=2.06 g/cm3, and $\rho_{b_3}$=2.66 g/cm3.

Since ADMM is only used to update few of the $v_g$'s (in the order of the sparsity of the SLM) per PG iteration, its computational complexity does not significantly affect that of Algorithm 2. On the other hand, the PG algorithm takes a few hundreds of iterations to converge to an acceptable precision as defined by the quality of the source tracks. This motivates future work exploring both predictor screening rules and accelerated PG methods as a mean to reduce the computational complexity of Algorithm 2 both by reducing G and the number of PG iterations required.

Figure 14:
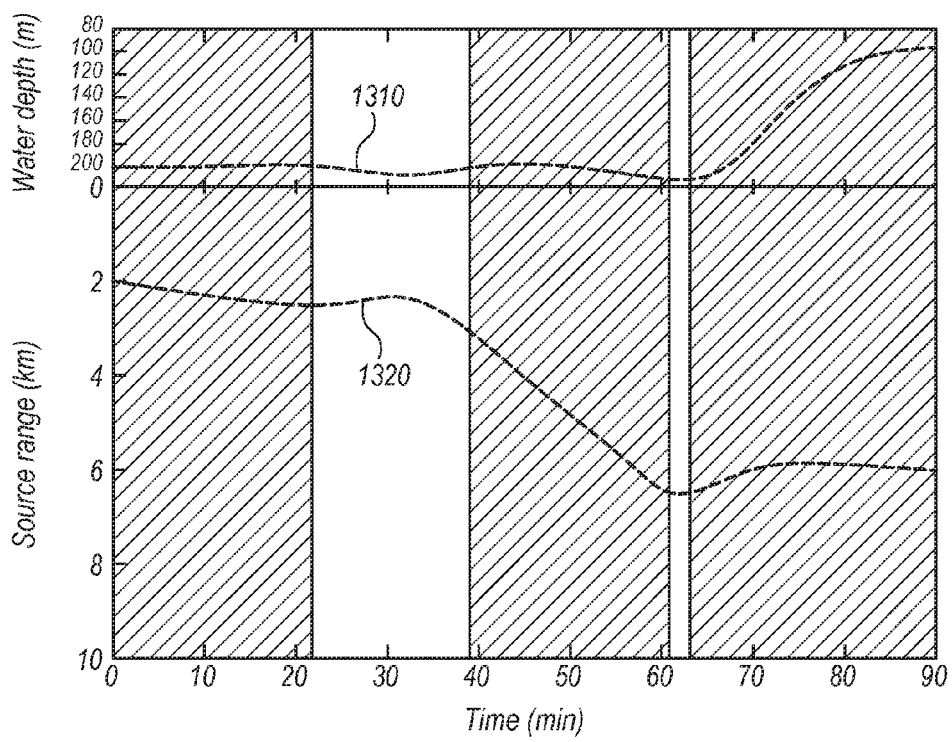
FIG. 14 shows the source range (bottom panel) and the water depth (top panel) along a trajectory of a towed acoustic source during SWellEX-3.
Figure 15:
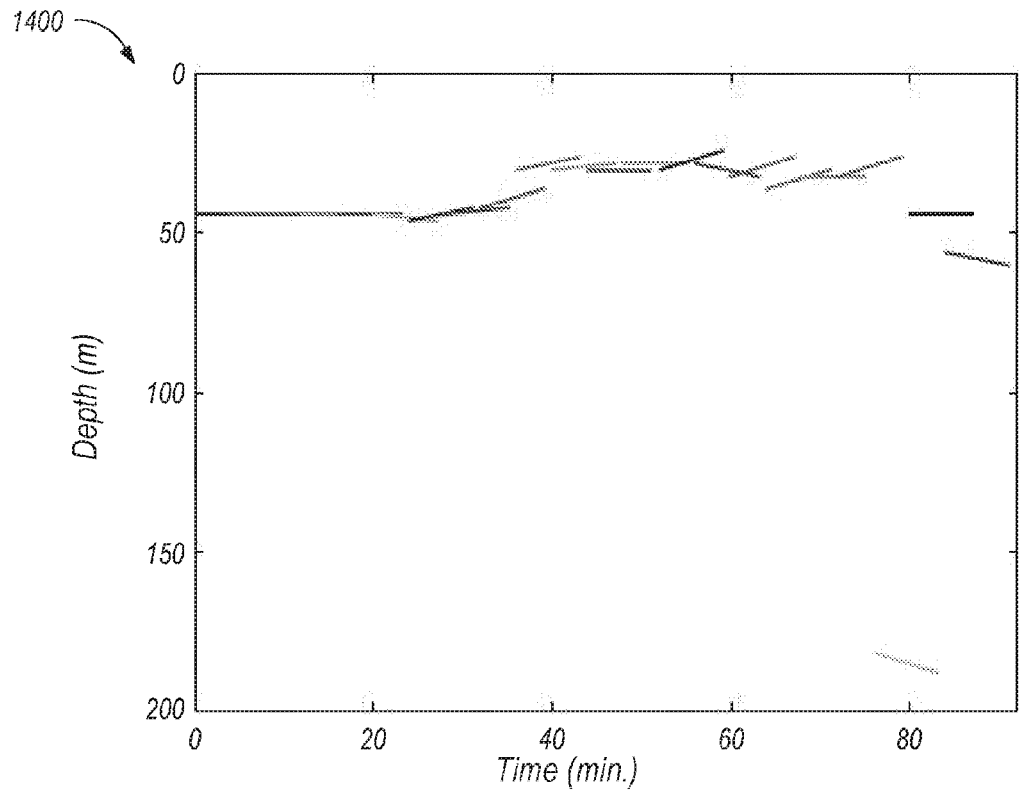
FIG. 15 shows a diagram illustrating an estimated depth track obtained for the source trajectory shown in FIG. 14 using matched field tracking.

The top portion the diagram 1300 shown in FIG. 14 illustrates the bathymetry 1310 along the range-trajectory of a towed acoustic source used during SWellEX-3, while the bottom portion of FIG. 14 shows the range-trajectory 1320 of the towed acoustic source. Note that the model used reflects the initial portion of the bathymetry (up to time 60 min). After time 60 min., there is increasing mismatch between the model used and the true propagation environment whose effect will be seen in the final portions of the tracks to be described next. An embodiment of the methods disclosed herein can alleviate this mismatch by dynamically updating the acoustic propagation model used according to the appropriate bathymetric data along the direction on which the source is located. This embodiment will use source location estimates (Eq. 3) to dynamically modify the model-based predictor based on the current source locations.

Figure 16:
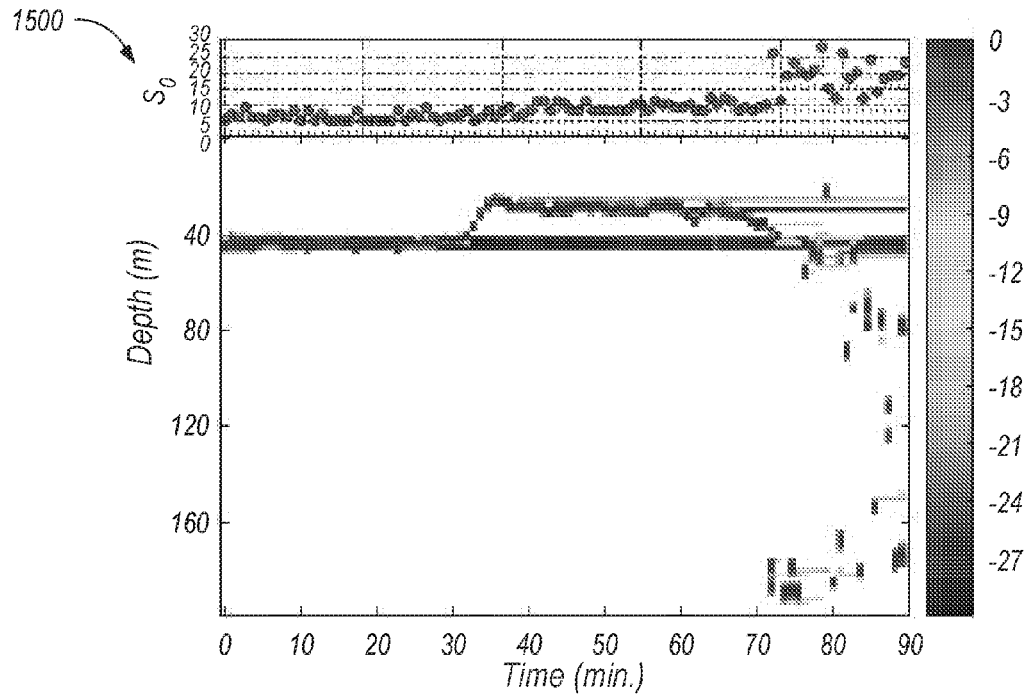
FIG. 16 shows a diagram illustrating an estimated depth track obtained for the source trajectory shown in FIG. 14 using an embodiment of a method in accordance with the Passive Tracking of Acoustic Sources with Sparse Innovations.
Figure 17:
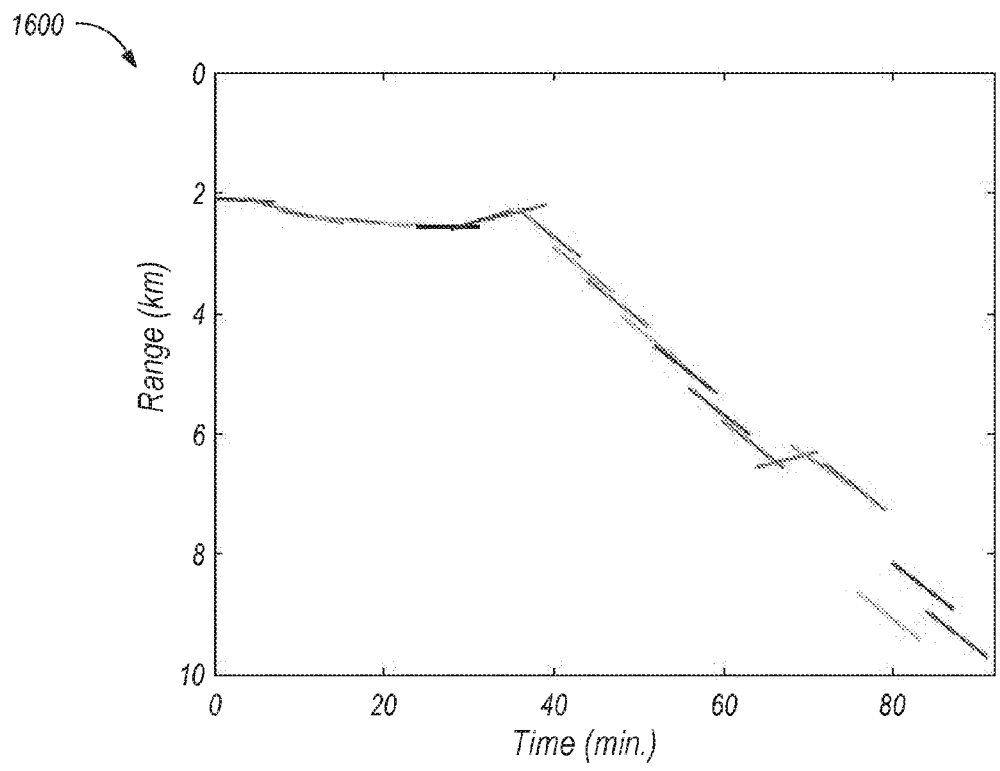
FIG. 17 shows a diagram illustrating an estimated range track obtained for the source trajectory shown in FIG. 14 using matched field tracking.
Figure 18:
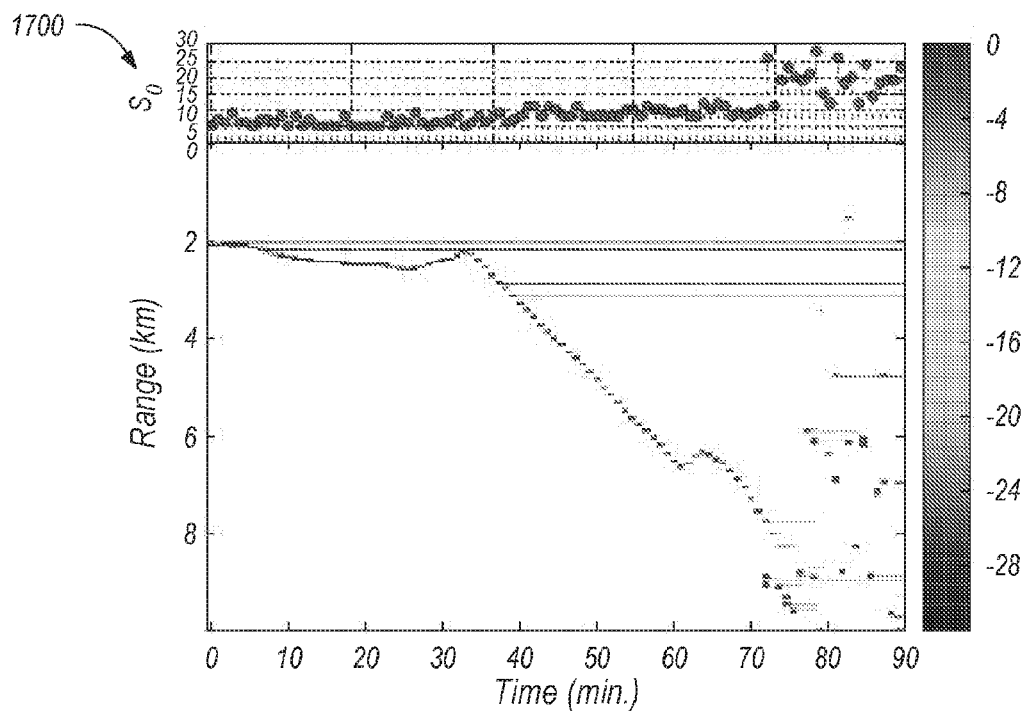
FIG. 18 shows a diagram illustrating an estimated range track obtained for the source trajectory shown in FIG. 14 using an embodiment of a method in accordance with the Passive Tracking of Acoustic Sources with Sparse Innovations.

Referring to FIGS. 15-18, FIG. 15 shows a diagram 1400 illustrating depth tracks obtained for one source using matched field tracking, FIG. 16 shows a diagram 1500 illustrating depth tracks obtained for one source using an embodiment of the methods disclosed herein, FIG. 17 shows a diagram 1600 illustrating range tracks obtained for one source using matched field tracking, and FIG. 18 shows a diagram 1700 illustrating range tracks obtained for one source using an embodiment of the methods disclosed herein.

MFT used a square search window of 22 grid points in range and 5 grid points in depth. The MFT tracks are formed by the tracklets (short tracks) that yielded the largest MFT score. The tracks corresponding to Algorithm 2 show the range and depth of the 10-largest non-zero entries in each SLM. Per SLM, the magnitude of all non-zero entries is normalized with respect to the magnitude of the largest coefficient present. The number of non-zero rows of S, denoted $S_0$, obtained for each SLM is shown above the tracks.

Despite its high computational complexity, MFT was used as a baseline for constructing the source tracks. A total of 8 ambiguity surfaces obtained via Bartlett MFP, corresponding to 109 seconds of recorded data, were used. Each ambiguity surface accounts for 13.65 seconds of recorded data. MFT tracks were incoherently averaged over frequency. For Algorithm 2, μ was adapted via grid search so as to obtain approximately 10 nonzero entries per SLM. Thus, control on the sparsity of the tracks was exercised. Per time instant, the tracks were constructed by plotting the range and depth of the largest coefficients in the corresponding SLMs. With our selection of tuning parameters, on average each SLM had 9 nonzero entries. When all peaks were plotted to construct the tracks, some artifacts (horizontal lines) appeared in the tracks. These artifacts corresponded to source locations being maintained as part of the track and can be removed by using a dynamic selection scheme for $\lambda$ and $\mu$.

By plotting fewer coefficients per SLM most of these artifacts can be removed. Note that after time index 70, the source reaches an area with significantly different bathymetry. Thus, the difficulty that both MFT and the disclosed method have in tracking the source during the last leg of the track is due to the mismatch between the environment and the model used to construct the replicas. Note that a robust localization framework can be used within the currently disclosed framework to mitigate the deleterious effect of model mismatch on the source-track estimates. A specific embodiment of a robust localization framework that can be readily extended to the currently disclosed framework is described in the commonly-assigned U.S. patent application Ser. No. 14/285,400, entitled "Multitask Learning Method for Broadband Source-Location Mapping of Acoustic Sources."

Figure 19:
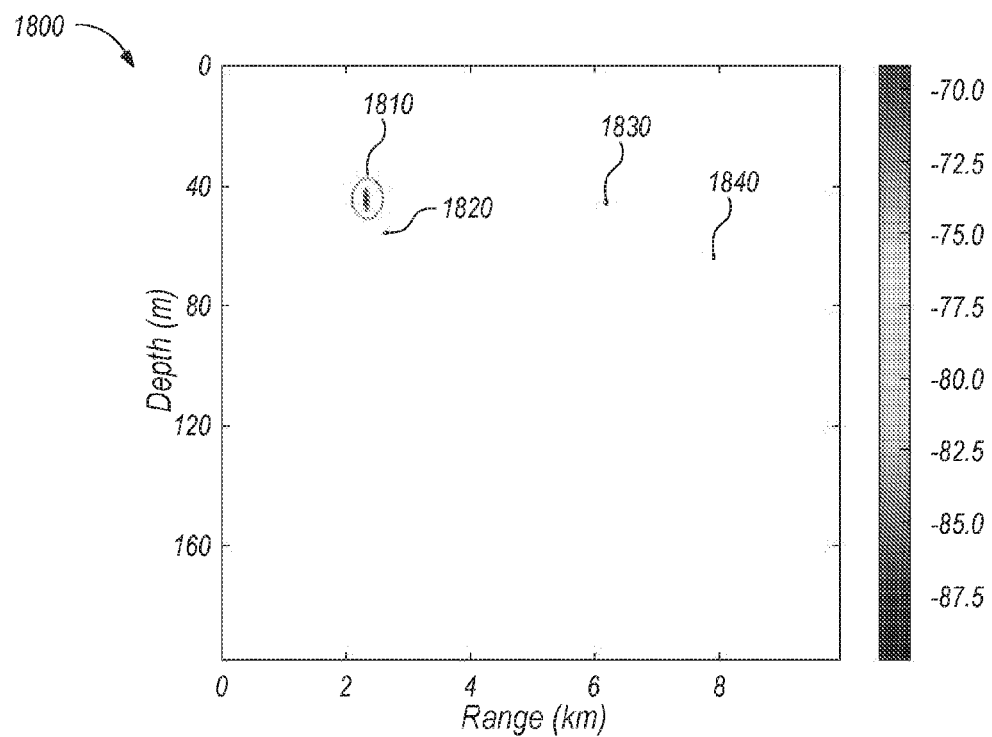
FIG. 19 shows a diagram illustrating a Source Location Map (SLM) obtained using an accelerated proximal gradient (PG) solver.

FIG. 19 shows a diagram 1800 illustrating a Source Location Map (SLM) obtained using an accelerated proximal gradient (PG) solver. As shown, reference 1810 represents the estimated source location, which in this case matches the true source locations, while references 1820, 1830, and 1840 represent artifacts, i.e., non-zero entries in the SLM that do not correspond to source locations. The color bar on the right illustrates the intensity of each point on the map in a decibel (dB) scale. Note that the magnitude of all artifacts is more than 10 dB below the magnitude of the point associated to the true source location.

Figure 20:
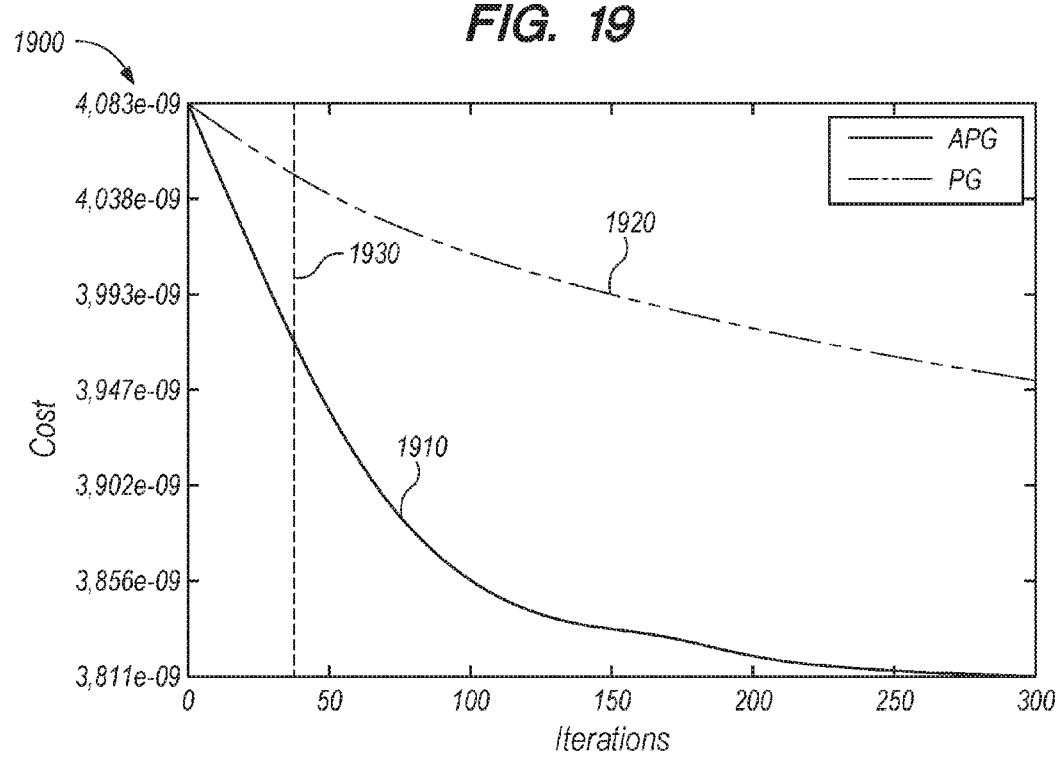
FIG. 20 shows a graph illustrating faster convergence using an accelerated PG solver versus a PG solver.

FIG. 20 shows a graph 1900 illustrating faster convergence using an accelerated PG solver versus a PG solver, where line 1910 represents the cost versus iterations for the accelerated PG solver and line 1920 represents the cost versus iterations for the PG solver. In practice, only a few iterations of either algorithm were needed to correctly identify the support of the SLMs (up to 40 iterations in this case). The dashed line 1930 illustrates the iteration value at which both algorithms were stopped, and the cost function value achieved by the PG and APG algorithms.

Figure 21:
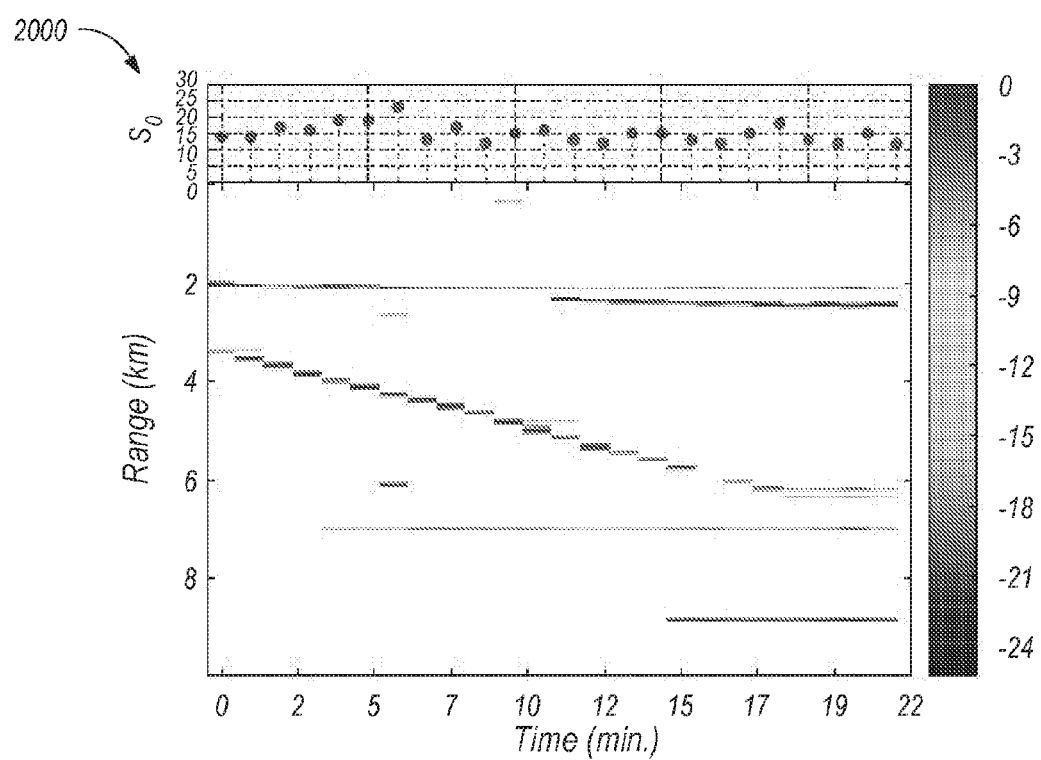
FIG. 21 shows a diagram illustrating range tracks obtained for two sources using an embodiment of a method in accordance with the Passive Tracking of Acoustic Sources with Sparse Innovations.

FIG. 21 shows a diagram 2100 illustrating range tracks obtained for two sources using an embodiment of a method in accordance with the Passive Tracking of Acoustic Sources with Sparse Innovations. In this case the presence of two sources in the environment was created artificially by combining two portions (first and second colored panels from left to right) of the one source track illustrated in FIG. 14. Similarly to the one source case, μ was adapted via grid search so as to obtain approximately 15 nonzero entries per SLM. The top portion of FIG. 21 illustrates the number of nonzero entries $S_0$ obtained per SLM. The bottom portion of FIG. 21 illustrates the estimated trajectories for the two sources, which as expected match portions of the one source trajectory shown in FIG. 14.

Although some embodiments of the method were discussed herein with regard to underwater source localization, some embodiments of the method may apply to other acoustic source localization environments, such as above water, where accurate in-air acoustic propagation models are available. The embodiments of the method disclosed herein may also be extended to exploit prior information about source locations so as to develop sparsity-cognizant tracking algorithms using passive sonar. Another possible extension involves using spatially-distributed arrays for localization as a way to exploit spatial diversity to counteract multipath affects in the localization performance and to reduce the presence of surveillance gaps.

Many modifications and variations of the Passive Tracking of Acoustic Sources with Sparse Innovations are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:
1. A method comprising the steps of:
   determining a grid $\mathcal{G}$ of G tentative locations $r_g$ to localize more than one acoustic sources;
   using an acoustic model to compute replicas that correspond to simulated acoustic sources at locations in $\mathcal{G}$, wherein the replicas comprise model-predicted Fourier coefficient vectors at F frequencies $\{\omega_f\}_{f=1}^F$ corresponding to the acoustic pressure field as sampled by an acoustic sensor array having N sensors;
   collecting, using the acoustic sensor array, time-series data of actual acoustic measurements at each sensor of the acoustic sensor array caused by the acoustic sources;
   using a short-time Fourier transform (STFT) on the collected time series data partitioned into m blocks to compute Fourier coefficient estimates at frequencies $\{\omega_f\}_{f=1}^F$ for all N sensors;
   constructing a set of Fourier coefficient vectors $Y^m := [y_1^m, \ldots, y_F^m] \in \mathbb{C}^{N \times F}$, where $[Y^m]_{n,f} \in \mathbb{C}$ denotes the Fourier coefficient corresponding to $\omega_f$ for the n-th sensor in the m-th STFT block;
   modeling Fourier coefficient vectors at $\omega_f$ for the m-th measurement block of the collected time series data as $y_f^m = \sum_{g=1}^G s_{g,f}^m p_{g,f} + \epsilon_{m,f}$, $\forall f$, where $s_{g,f}^m$ denotes the unknown Fourier coefficient associated to the acoustic signature at frequency $\omega_f$ for a source located at $r_g$, $p_{g,f} \in \mathbb{C}^N$ is the replica for $\omega_f$ corresponding to a source located at $r_g$ normalized so that $\|p_{g,f}\|_2 = 1$, and $\epsilon_{m,f}$ denotes the Fourier coefficients at $\omega_f$ corresponding to the noise in the m-th block;
   setting to zero all values of $s_{g,f}^m$ associated to tentative locations $r_g$ where acoustic sources are presumed to be absent;
   obtaining, at time $\tau_m$, an estimate $S^m$ as the solution to

$$\min_{S \in \mathbb{C}^{G \times F}} \frac{1}{2} \sum_{f=1}^F \|y_f^m - P_f s_f\|_2^2 + \sum_{g=1}^G \left[ \mu \|\varsigma_g\|_2 + \lambda \|\varsigma_g - \varsigma_g^{m-1}\|_2 \right],$$

where $S := [s_1, \ldots, s_F] \in \mathbb{C}^{G \times F}$, $\varsigma'_g$ is the g-th row of S, $P_f := [p_{1,f}, \ldots, p_{G,f}] \in \mathbb{C}^{N \times G}$ is the matrix of replicas for $\omega_f$ and $\mu, \lambda > 0$ are tuning parameters; and generating one or more source location maps (SLMs) over $\mathcal{G}$ per frequency $\omega_f$ using $S^m$, wherein each location on a particular SLM is associated with the magnitude of its corresponding acoustic gain estimate $|\hat{s}_{g,f}|$, wherein estimates of the actual locations of the K acoustic sources, $\{\hat{r}_k(\tau_m)\}_{k \in K}$, correspond to the locations of the K-largest coefficients $|\hat{s}_{g,f}|$ depicted in the SLM.

2. The method of claim 1, wherein the step of determining a grid of tentative locations of an acoustic source includes the step of estimating the number of acoustic sources.

3. The method of claim 1, wherein the step of generating SLMs over $\mathcal{G}$ per frequency $\omega_f$ comprises using each column $s_f$ of $S_m$ to construct the SLMs per frequency $\omega_f$.

4. The method of claim 1, wherein the step of generating SLMs over $\mathcal{G}$ per frequency $\omega_f$ comprises generating a broadband SLM over $\mathcal{G}$ comprising all frequencies $\omega_f$ used to compute $S^m$ using a whole row of $S^m$ for each $r_g \in \mathcal{G}$.

5. The method of claim 1, wherein the step of generating SLMs over $\mathcal{G}$ per frequency $\omega_f$ comprises generating a broadband SLM over $\mathcal{G}$ using $S^m$ by plotting the pairs $(r_g, \|\varsigma_g^m\|_2)$ for all $r_g \in \mathcal{G}$, where $\varsigma_g^m := [s_{g,1}^m, \ldots, s_{g,F}^m]' \in \mathbb{C}^F$ comprises the entries of the g-th row of $S^m$.

6. The method of claim 1, wherein the estimates of the actual locations of the K acoustic sources $\{\hat{r}_k(\tau_m)\}_{k \in X}$ indexed by the index-set $X \subset \{1, \ldots, K\}$ are given by the locations that correspond to the K-largest entries in the SLM, $X \in \max_{|x|=K} \sum_{\kappa \in x} \|\varsigma_\kappa^m\|_2$.

7. The method of claim 1, wherein the SLMs are generated using an iterative problem solver based upon a proximal gradient method.

8. The method of claim 1, wherein the acoustic sources are selected from surface-based acoustic sources and underwater acoustic sources.

9. The method of claim 8, wherein the acoustic model is an underwater acoustic model and the acoustic sensor array is a hydrophone array.

10. A system comprising:
   a processor operatively connected to an acoustic sensor array, wherein the processor is configured to perform the steps of:
   determining a grid $\mathcal{G}$ of G tentative locations $r_g$ to localize more than one acoustic sources;
   using an acoustic model to compute replicas that correspond to simulated acoustic sources at locations in $\mathcal{G}$, wherein the replicas comprise model-predicted Fourier coefficient vectors at F frequencies $\{\omega_f\}_{f=1}^F$ corresponding to the acoustic pressure field as sampled by an acoustic sensor array having N sensors;
   collecting, using the acoustic sensor array, time-series data of actual acoustic measurements at each sensor of the acoustic sensor array caused by the acoustic sources;
   using a short-time Fourier transform (STFT) on the collected time series data partitioned into m blocks to compute Fourier coefficient estimates at frequencies $\{\omega_f\}_{f=1}^F$ for all N sensors;
   constructing a set of Fourier coefficient vectors $Y^m := [y_1^m, \ldots, y_F^m] \in \mathbb{C}^{N \times F}$, where $[Y^m]_{n,f} \in \mathbb{C}$ denotes the Fourier coefficient corresponding to $\omega_f$ for the n-th sensor in the m-th STFT block;
   modeling Fourier coefficient vectors at $\omega_f$ for the m-th measurement block of the collected time series data as $y_f^m = \sum_{g=1}^G s_{g,f}^m p_{g,f} + \epsilon_{m,f}$, $\forall f$, where $s_{g,f}^m$ denotes the unknown Fourier coefficient associated to the acoustic signature at frequency $\omega_f$ for a source located at $r_g$, $p_{g,f} \in \mathbb{C}^N$ is the replica for $\omega_f$ corresponding to a source located at $r_g$ normalized so that $\|p_{g,f}\|_2 = 1$, $\epsilon_{m,f}$ denotes the Fourier coefficients at $\omega_f$ corresponding to the noise in the m-th block;

setting to zero all values of $s_{g,f}^m$ associated to tentative locations $r_g$ where acoustic sources are presumed to be absent;

obtaining, at time $\tau_m$, an estimate $S^m$ as the solution to $$\min_{S \in \mathbb{C}^{G \times F}} \frac{1}{2} \sum_{f=1}^{F} \|y_F^m - P_f s_f\|_2^2 + \sum_{g=1}^{G} \left[ \mu \|\varsigma_g\|_2 + \lambda \|\varsigma_g - \varsigma_g^{m-1}\|_2 \right],$$

where $S := [s_1, \ldots, s_F] \in \mathbb{C}^{G \times F}$, $\varsigma'_g$ is the g-th row of S, $P_f := [p_{1,f}, \ldots, p_{G,f}] \in \mathbb{C}^{N \times G}$ is the matrix of replicas for $\omega_f$, and $\mu, \lambda > 0$ are tuning parameters; and generating one or more source location maps (SLMs) over $\mathcal{G}$ per frequency $\omega_f$ using $S^m$, wherein each location on a particular SLM is associated with the magnitude of its corresponding acoustic gain estimate $|\hat{s}_{g,f}|$, wherein estimates of the actual locations of the K acoustic sources, $\{\hat{r}_k(\tau_m)\}_{k \in \mathcal{K}}$, correspond to the locations of the K-largest coefficients $|\hat{s}_{g,f}|$ depicted in the SLM.

11. The system of claim 10, wherein the step of determining a grid of tentative locations of an acoustic source includes the step of estimating the number of acoustic sources.

12. The system of claim 10, wherein the step of generating SLMs over $\mathcal{G}$ per frequency $\omega_f$ comprises using each column $s_f$ of $S^m$ to construct the SLMs per frequency $\omega_f$.

13. The system of claim 10, wherein the step of generating SLMs over $\mathcal{G}$ per frequency $\omega_f$ comprises generating a broadband SLM over $\mathcal{G}$ comprising all frequencies $\omega_f$ used to compute $S^m$ using a whole row of $S^m$ for each $r_g \in \mathcal{G}$.

14. The system of claim 10, wherein the step of generating SLMs over $\mathcal{G}$ per frequency $\omega_f$ comprises generating a broadband SLM over $\mathcal{G}$ using $S^m$ by plotting the pairs $(r_g, \|\varsigma_g^m\|_2)$ for all $r_g \in \mathcal{G}$, where $\varsigma_g^m := [s_{g,1}^m, \ldots, s_{g,F}^m]' \in \mathbb{C}^F$ comprises the entries of the g-th row of $S^m$.

15. The system of claim 10, wherein the estimates of the actual locations of the K acoustic sources $\{\hat{r}_k(\tau_m)\}_{k \in X}$ indexed by the index-set $X \subset \{1, \ldots, K\}$ are given by the locations that correspond to the K-largest entries in the SLM, $X \in \max_{|X|=K} \sum_{\kappa \in X} \|\varsigma_\kappa^m\|_2$.

16. The system of claim 10, wherein the SLMs are generated using an iterative problem solver based upon a proximal gradient method.

17. The system of claim 10, wherein the acoustic sources are surface-based acoustic sources.

18. The system of claim 10 wherein the acoustic sources are underwater acoustic sources.

19. The system of claim 10, wherein the acoustic model is an underwater acoustic model and the acoustic sensor array is a hydrophone array.

20. A system comprising:

a processor operatively connected to a hydrophone array having N hydrophones, wherein the processor is configured to perform the steps of:

determining a grid $\mathcal{G}$ of G tentative locations $r_g$ to localize more than one underwater acoustic sources;

using an underwater acoustic model to compute replicas that correspond to simulated acoustic sources at locations in $\mathcal{G}$ wherein the replicas comprise model-predicted Fourier coefficient vectors at F frequencies $\{\omega_f\}_{f=1}^{F}$ corresponding to the acoustic pressure field as sampled by the N hydrophones;

collecting, using the hydrophone array, time-series data of actual acoustic measurements at each hydrophone of the hydrophone array caused by the underwater acoustic sources;

using a short-time Fourier transform (STFT) on the collected time series data partitioned into m blocks to compute Fourier coefficient estimates at frequencies $\{\omega_f\}_{f=1}^{F}$ for all N hydrophones;

constructing a set of Fourier coefficient vectors $Y^m := [y_1^m, \ldots, y_F^m] \in \mathbb{C}^{N \times F}$, where $[Y^m]_{n,f} \in \mathbb{C}$ denotes the Fourier coefficient corresponding to $\omega_f$ for the n-th sensor in the m-th STFT block;

modeling Fourier coefficient vectors at $\omega_f$ for the m-th measurement block of the collected time series data as $y_f^m = \sum_{g=1}^{G} s_{g,f}^m p_{g,f} + \epsilon_{m,f}$, $\forall f$, where $s_{g,f}^m$ denotes the unknown Fourier coefficient associated to the acoustic signature at frequency $\omega_f$ for a source located at $r_g$, $p_{g,f} \in \mathbb{C}^N$ is the replica for $\omega_f$ corresponding to an underwater acoustic source located at $r_g$ normalized so that $\|p_{g,f}\|_2 = 1$, and $\epsilon_{m,f}$ denotes the Fourier coefficients at $\omega_f$ corresponding to the noise in the m-th block;

setting to zero all values of $s_{g,f}^m$ associated to tentative locations $r_g$ where underwater acoustic sources are presumed to be absent;

obtaining, at time $\tau_m$, an estimate $S^m$ as the solution to $$\min_{S \in \mathbb{C}^{G \times F}} \frac{1}{2} \sum_{f=1}^{F} \|y_F^m - P_f s_f\|_2^2 + \sum_{g=1}^{G} \left[ \mu \|\varsigma_g\|_2 + \lambda \|\varsigma_g - \varsigma_g^{m-1}\|_2 \right],$$

where $S := [s_1, \ldots, s_F] \in \mathbb{C}^{G \times F}$, $\varsigma'_g$ is the g-th row of S, $P_f := [p_{1,f}, \ldots, p_{G,f}] \in \mathbb{C}^{N \times G}$ is the matrix of replicas for $\omega_f$, and $\mu, \lambda > 0$ are tuning parameters; and generating one or more source location maps (SLMs) over $\mathcal{G}$ per frequency $\omega_f$ using $S^m$, wherein each location on a particular SLM is associated with the magnitude of its corresponding acoustic gain estimate $|\hat{s}_{g,f}|$, wherein estimates of the actual locations of the K underwater acoustic sources, $\{\hat{r}_k(\tau_m)\}_{k \in \mathcal{K}}$, correspond to the locations of the K-largest coefficients $|\hat{s}_{g,f}|$ depicted in the SLM.

* * * * *